United States Patent
Tsypliaev et al.

(10) Patent No.: US 10,019,537 B1
(45) Date of Patent: Jul. 10, 2018

(54) SYSTEM AND METHOD FOR DATA SEARCH IN A GRAPH DATABASE

(71) Applicant: Comindware Ltd., Tortola (VG)

(72) Inventors: Maxim V. Tsypliaev, Moscow (RU); Peter A. Volynskiy, Moscow (RU)

(73) Assignee: Comindware Ltd., Tortola (VG)

( * ) Notice: Subject to any disclaimer, the term of this patent is extended or adjusted under 35 U.S.C. 154(b) by 557 days.

(21) Appl. No.: 14/546,207

(22) Filed: Nov. 18, 2014

(51) Int. Cl.
*G06F 17/30* (2006.01)

(52) U.S. Cl.
CPC .... *G06F 17/30958* (2013.01); *G06F 17/3053* (2013.01); *G06F 17/30734* (2013.01)

(58) Field of Classification Search
CPC .......... G06F 17/30958; G06F 17/3053; G06F 17/30734
See application file for complete search history.

(56) References Cited

U.S. PATENT DOCUMENTS

| | | | |
|---|---|---|---|
| 8,478,766 B1* | 7/2013 | Tsypliaev | G06F 17/30566 705/7.11 |
| 2010/0153090 A1* | 6/2010 | Chen | G06F 17/2785 704/2 |
| 2011/0282855 A1* | 11/2011 | Ronen | G06F 17/30637 707/706 |
| 2012/0179696 A1* | 7/2012 | Charlot | G06F 17/30731 707/750 |
| 2012/0254102 A1* | 10/2012 | Li | G06Q 10/10 706/58 |

\* cited by examiner

*Primary Examiner* — Alexander Khong
(74) *Attorney, Agent, or Firm* — Bardmesser Law Group

(57) ABSTRACT

A method for auto-generation of tags and retrieval of data form a graph-based database. A triplestore is a purpose-built database for the storage and retrieval of triples, a triple being a data entity (also known as a statement) composed of Subject-Predicate-Object. A triplestore is optimized for the storage and retrieval of triples. A query language is used for accessing to triples stored in the triplestore. A search items need to be tagged for search and retrieval. The number of tags increases as the amount of data increases. Stored data changes over time, so the old tags are deleted or replaced by the new tags. A large number of new tags must be created. The tags (i.e., autotags) are created automatically to facilitate efficient data retrieval from the triplestore.

21 Claims, 9 Drawing Sheets

SYSTEM AND METHOD FOR DATA SEARCH IN A GRAPH DATABASE

CROSS REFERENCE TO RELATED APPLICATIONS

This application is a continuation-in-part of U.S. patent application Ser. No. 14/966,311, filed on Dec. 11, 2015, which is a continuation of U.S. patent application Ser. No. 13/932,597, filed on Nov. 26, 2014, which is a continuation in part of U.S. patent application Ser. No. 13/019,319, filed on Feb. 2, 2011, incorporated by reference herein in their entirety.

BACKGROUND OF THE INVENTION

Field of the Invention

The present invention is related to methods for data search, and in particular, to a method for searching data in graph-based databases.

Description of the Related Art

Computer systems are often used to store large amounts of data from which individual records must be retrieved according to some search criterion. Thus, the efficient storage of data to facilitate fast searching and retrieval is a critical issue.

The search data is inextricably linked with the concept of data filtering. In general, as related to data, the search means a procedure used for examining large amounts of data in order to find non-obvious, hidden or lost parts. The search data is usually associated with processing of data storage. A lot of search algorithms are used for data searching depending on the nature of data.

The data search can imply a search for files on the data storage, the search for data within files/documents, data/information in the Internet, data in the database, and so on. Usually, the data search (i.e., a search for an item) is done based on various parameters of data that distinguish the given data from other data (i.e., the search by parameter(s), which uniquely characterize desired data). For example, a file name, a file type, a file size can be used as such distinctive characteristics; a table name, a table ID—for DB; a number of characters in the word, a part of speech—for words, and so on. Tags can be used to facilitate and optimize data search.

Usually, a tag can be assigned to the document manually, during the process of data or documents creation, storing and/or adding to a database. Tags characterize the data, so these tags can be used for the data searching. A tag is a non-hierarchical keyword or term assigned to a piece of information (such as an Internet bookmark, digital image, or computer file). This kind of metadata helps to describe the data and allows for it to be found again by searching. The tags are generally chosen informally and personally by the data's creator or by its viewer, depending on the system, the data structure, type of data, the data content, the data context, and so on. For example, data related to computer science can be characterized by tags "computer," "science," "information," "software," "hardware" and etc. Various algorithms can be used for tag creation.

For example, tags can be created based on the results of the analysis of the document's text. Tags can be created automatically (referred to as "autotags" below) for the document and can be further associated with it. Autotags can be created not only for the data/document search, but for an Item search, for example, in the database (DB). The Item is an entity, for example, business-entity: the task "Add a description for the animal picture" is the Item, an employee "Bill"—is an Item as well, a request for "The bridge building," a record in the DB for the user, IT department, HR department, or any other entity. Such entities in programming field are called class instances. So user "Bill" is an instance of the "User" Class; IT department, HR department are the instances of the "department" Class, etc. Such Items are the desired data, which user is interested in, and which must be found in the database.

The tags can be created for any data types stored in various form, for example, in a form of triples/n-tuples. The triples, for example, can be stored in the various types of databases, for example, relational, hierarchical, network-based, object-oriented DB, and etc.

Typically, the triples are stored in a triplestore. The triplestore is a special database for storage and retrieval of the triples. A triplestore is a purpose-built database for the storage and retrieval of triples, a triple being a data entity (also known as a statement) composed of Subject-Predicate-Object, like "John is 35" or "John knows Helen."

Unlike a relational database, a triplestore is optimized for the storage and retrieval of triples. A query language is used for accessing the triples stored in the triplestore. In addition to queries, triples can usually be imported/exported using Resource Description Framework (RDF) and other formats. Some triplestores are built as database engines from scratch, while others are built on top of the existing commercial relational database engines (i.e., SQL-based). Like the early development of online analytical processing (OLAP) databases, this intermediate approach allowed large and powerful database engines to be constructed for little programming effort in the initial phases of triplestore development.

However, in a long-term it is likely that the native triplestores will have the advantages in terms of performance. A difficulty with implementing triplestores over SQL is that although triples can be stored, implementing efficient querying of a graph-based RDF model onto SQL queries is difficult.

The number of tags increases as the amount of data increases. Stored data changes over time, so the old tags are deleted or replaced by the new tags. The new tags must be created. Usually, data items intersect with each other, and changing of one piece data can affect other data. Manual creation of tags for new data and update of changed data is extremely time-consuming and costly process.

Accordingly, a method for automated creation of tags and ranking of data based on tag weights to facilitate data retrieval is desired.

SUMMARY OF THE INVENTION

The present invention is related to method for searching data in graph-based databases that substantially overcomes the disadvantages of the related art.

In one aspect of the invention, a method for auto-generation of tags and retrieval of data form a graph-based database is provided. According to the exemplary embodiment, triples are stored in a triplestore. The triplestore is a special database for storage and retrieval of the triples. A triplestore is a purpose-built database for the storage and retrieval of triples, a triple being a data entity (also known as a statement) composed of Subject-Predicate-Object.

Unlike a relational database, a triplestore is optimized for the storage and retrieval of triples. A query language is used for accessing to triples stored in the triplestore. In addition to queries, triples can usually be imported/exported using Resource Description Framework (RDF) and other formats. The search items need to be tagged for search and retrieval. The number of tags increases as the amount of data increases. Stored data changes over time, so the old tags are deleted or replaced by the new tags. The new tags must be created. The tags are created automatically (i.e., autotags) to facilitate efficient data retrieval.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

A query language is used for accessing to triples stored in the triplestore. In addition to queries, triples can usually be imported/exported using Resource Description Framework (RDF) and other formats. The search items need to be tagged for search and retrieval. The number of tags increases as the amount of data increases. Stored data changes over time, so the old tags are deleted or replaced by the new tags. The new tags must be created. The tags are created automatically (i.e., autotags) to facilitate efficient data retrieval.

The following are two examples of representing RDF graphs in XML format (which is frequently more convenient for computer-based processing) and in the form of N-triples or N3s (which is used in the present approach, and which is more convenient for human understanding).

XML syntax:
```
<?xml version="1.0"?>
<rdf:RDF
xmlns:rdf="http://www.w3.org/1999/02/22-rdf-syntax-ns#"
xmlns:dc="http://purl.org/dc/elements/1.1/"
xmlns:exterms="http://www.example.org/terms/">
<rdf:Description rdf:about="http://www.example.org/index.html">
<exterms:creation-date>Aug. 16, 1999</exterms:creation-date>
</rdf:Description>
<rdf:Description rdf:about="http://www.example.org/index.html">
<dc:language>en</dc:language>
</rdf:Description>
</rdf:RDF>
```

N3 syntax would be as follows:
ex:index.html dc:creator exstaff:85740.
ex:index.html exterms:creation-date "Aug. 16, 1999".
ex:index.html dc:language "en".

Thus, the XML syntax is far more verbose than the N3 syntax, but, it is much easier for computers to process.

Figure 1:
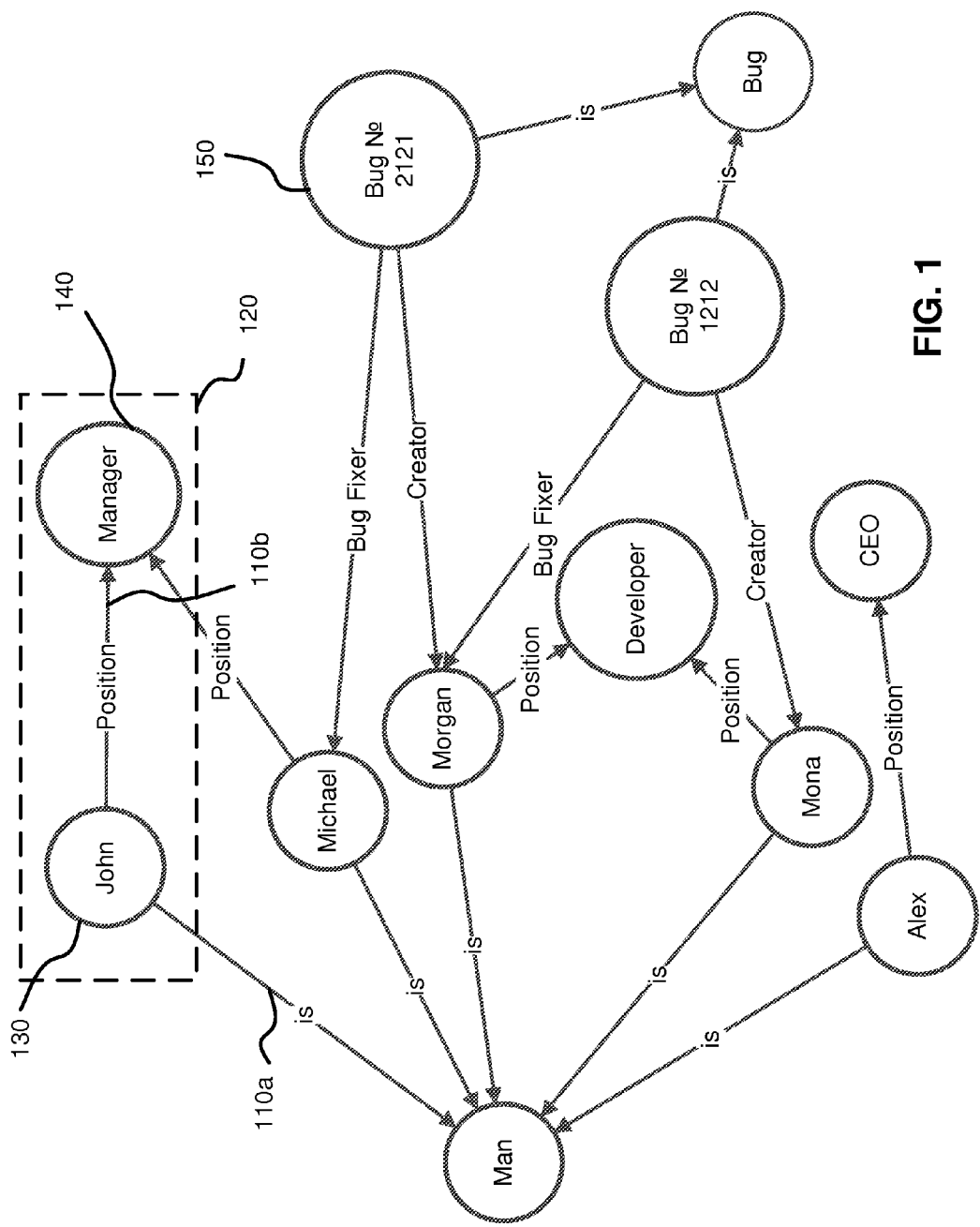
FIG. 1 illustrates an example of a graph, in accordance with the exemplary embodiment.

The triple is a basic unit of the RDF Resource Description Framework (RDF), and consists of a Subject, a Predicate, and an Object. The set of triples is commonly referred to as an RDF graph, an example of which is shown in FIG. 1. A direction of an arrow (e.g., (110*a*, 110*b*) in any given triple (e.g., 120) points from the Subject (130) to the Object (140). The RDF data model is similar to classic conceptual modeling approaches such as entity-relationship or class diagrams, as it is based upon the idea of making statements about resources (in particular web resources) in the form of Subject-Predicate-Object expressions.

These expressions are viewed as triples in RDF terminology. The Subject denotes the resource, and the Predicate denotes traits or aspects of the resource and expresses a relationship between the Subject and the Object. A collection of RDF statements intrinsically represents a labeled, directed multi-graph. As such, an RDF-based data model is more naturally suited to certain kinds of knowledge representation than the relational model and other ontological models.

As mentioned above, the RDF data is often resides in relational database or in a native Triple stores, or Quad stores if context (i.e., the named graph) is also stored for each RDF triple. Named graphs are a key concept of Semantic Web architecture in which a set of Resource Description Framework statements (a graph) are identified using a URI, allowing descriptions to be made of that set of statements, such as context, provenance information or other metadata.

Named graphs are a simple extension of the RDF data model through which graphs can be created, but the model lacks an effective means of distinguishing between them once published on the Web at large. While named graphs may appear on the Web as simple linked documents (i.e., Linked Data), they are also very useful for managing sets of RDF data within an RDF store.

In FIG. 1 the object "Man", "Manager" 140 and subjects "John" 130, "Michael," "Morgan," "Mona," "Alex" of an RDF statement is a Uniform Resource Identifier (URI), which denote resources. Resources also can be indicated by blank nodes. Blank nodes are not directly identifiable from the RDF statement. A blank node is a node in the RDF graph representing a resource for which a URI or literal is not given. The resource represented by the blank node is also called an anonymous resource. According to the RDF standard, a blank node can only be used as Subject or Object of an RDF triple. Blank nodes can be denoted through blank node identifiers in the following formats, RDF/XML, Turtle, N3 and N-Triples. The following example shows how it works in RDF/XML:

"<rdf:Description rdf:about="http://www.mkp.lon.com/~hy561" dc:title="Web Data Management">
    <ex:student rdf:nodeID="_:b"I>
</rdf:Description>
<rdf:Description rdf:nodeID="_:b" ex:fullName="Sam Adams">
    <ex:homePage rdf:resource="http://www.mkp.lon.com/~adams/"/>
</rdf:Description>".

The blank node identifiers are only limited in scope to a serialization of a particular RDF graph, i.e. the node "_:b" in the subsequent example does not represent the same node as a node named "_:b" in any other graph. The blank nodes are treated as simply indicating the existence of a thing, without using a URI (Uniform Resource Identifier) to identify any particular thing. This is not the same as assuming that the blank node indicates an "unknown" URI.

The Predicate ("is" 110a,"position" 110b) is a URI, which also indicates a resource, representing a relationship. The Object ("Manager," "Developer," "CEO" and in particular cases "John," "Michael," "Morgan," "Mona," "Alex") is a URI, blank node or a Unicode string literal. The triple approach is one that is utilized in the present invention to process information from various sources.

Figure 2:
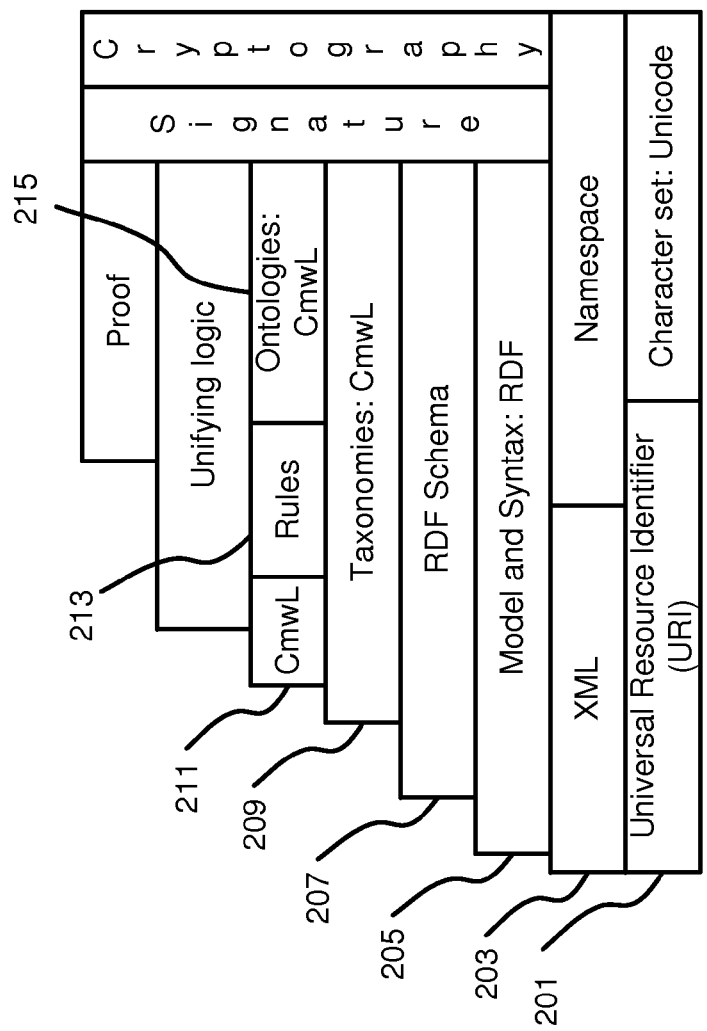
FIG. 2 illustrates a portion of the semantic web, in accordance with the exemplary embodiment.

As shown in FIG. 2, there is the semantic stack of the exemplary embodiment. The semantic stack utilized in the exemplary embodiment includes the Uniform Resource Identifier (URI) 201. Note that anything that can be identified with a URI can be described, so the semantic web can refer to animals, people, places, ideas, etc. Semantic markup is often generated automatically, rather than manually. URIs can be classified as locators (URLs), as names (URNs), or as both.

A uniform resource name (URN) serves as a person's name, while a uniform resource locator (URL) resembles that of person's street address. The URN defines an Item's identity, while the URL provides a method for finding it. CmwL (Comindware Language) 211 describes the function and relationship of each of these components of the semantic web stack; XML 203 provides an elemental syntax for content structure within documents, yet associates no semantics with the meaning of the content contained within; the RDF 205 is a simple language for expressing data models, which refers to objects ("resources") and their relationships. An RDF-based model can be represented in XML syntax. The RDF schema 207 extends the RDF and is a vocabulary for describing properties and classes of RDF-based resources and semantics for generalized-hierarchies of such properties and classes.

Ontology 215 formally represents knowledge as a set of concepts within a domain, using a shared vocabulary to denote the types, properties and interrelationships of these concepts. Ontologies are the structural frameworks for organizing information. The ontologies are described by (Web Ontology Language) OWL or by CmwL, which allow to describe the Classes and their relations with each other and other entities (see below). The ontologies can extend pre-defined dictionary (for example, RDF or OWL dictionaries). The dictionary represents a collection of data/information of certain terms that have the same meaning in all contexts.

The ontology uses the pre-defined reserved dictionary/glossary of terms for concepts and relations determining for a particular domain/subject area. The ontologies can be used to express the semantics of dictionary terms, their relationships and contexts of usage. So RDF Schema is a dictionary for the RDF. OWL or CmwL can be used to record the semantic of subject areas to the ontologies. Essentially, any data, for example, ontologies or taxonomies, can be expressed in triples. The triple is a fact.

Taxonomy 209 is a hierarchical way to categorize all the items in a given world: books, products, species, concepts, etc. In the semantic web, the taxonomy is a dictionary of terms and their precise definitions. When a dictionary is ordered logically within a hierarchy, it is called taxonomy. It is a shared resource everyone in an information ecosystem uses to sync the meaning of terms.

Comindware language 211 is used instead of the Web Ontology Language (OWL) in the semantic stack. Comindware language represents a limited version of OWL, in order to improve performance and get rid of functionality and operations that are not necessary for the purposes of business applications and/or for using with the ontologies (but using OWL vocabulary and some of its rules 213).

Comindware language is described in details in the U.S. Pat. No. 8,478,766.

In terms of data storage, the relational database is not the best choice for RDF-repository as it is ill-suited to work with loosely structured data. In relational databases, MySQL search for the information on the tags is solved by introducing a staging table, so that the following structure can be obtained:

Tags table: tag_id, title
Articles table: article_id
Linking table: tag_id, article_id.

If the Task table, Users table, Accounts table and other tables are used in addition to Articles table, a lot of Linking tables (Linking table 2, Linking table 3, etc.) must be created. In this case, if one adds, deletes or edits any data in one of the table, the related data in other tables must be changed as well. If we need to access the data from multiplies tables, the SQL JOIN clause must be used. The SQL JOIN clause combines records from two or more tables in a database. It creates a set that can be saved as a table or used as is. A JOIN is the means for combining fields from two tables by using values common to each (IDs for example). This and other related operations require a large amount of time.

Relational databases provide for a sufficiently high speed search only for the data for which the search was set up/adjusted. For example, the search for SQL-databases uses SQL-requests that have to be rewritten every time the new data is added to a database or the new data types, which differed from the data stored in the database, are used. Another example is adding of the department (no departments was added previously and such Item was not used) to a database. In this case, new department adding must be available for adding: IT, HR, R&D, and other. So few tables must be created, wherein at least one of it stores department data and at least another table stores the relations with other database tables.

A lot of SQL-requests (including search requests) must be changed/re-written, to allow for search of the stored data.

Such re-writing/changes of the requests/queries is extremely costly and resource-intensive activity associated with the involvement of the database operator and/or the developer. The exemplary embodiment provides a system, which automatically adapts to changes within the database data, and which implements the search request(s) that are simple for a user, such as: "What should I find?"→"Bugs"+"High priority", or "manager"+"Alex"). Such user search requests can use the text fields, where search request can be entered. Also, the system must provide the selection of the data type/search set, wherein the search is to be performed.

An application for implementing the exemplary embodiment includes a Graphical User Interface (GUI), text user interface, console, and other elements for interaction of the person with the system/application. The GUI can include text field, where a user can enter the search term, to start the Item (sometimes referred to as "data objects") search process. Note that the GUI can contain more than one text field. The user can enter the part of the search word to the text field, and the system provides variants for auto-complete of this word. For example, a user can enter the first characters of the word (or characters from the middle of the word) "Morgan," i.e. "Mo" to the text area.

The system will provide possible variant for auto-completing (endings of the words, i.e. words, where such sequence will be found, or where these characters are found in any sequence), "Morgan" and "Mona." Further, the system is available to provide the search area to the user with using the GUI, for example. The search area is represented by a triple predicates, which are associated with the search word. For example, for the "Morgan" word the system will provide the following search areas: "Creator," "Bug Fixer," and other, if they were found in the database. Such variants of search areas are represented by autotag predicates for found autotags for the "Morgan" word. If a user will select the "Creator" search area, the result of the search will include "Bug No. 2121", according to FIG. 1.

Herein a "Bug" is a Class, and "Bug No. 2121" is an instance of this Class. Note that the search area can be identified/defined and more narrowed. The examples of Classes and the instances for specific cases will be discussed below. The GUI allows the user to select at least one search area for entered search word or a part of it. The user can skip a selection of the specific search area, such as "Creator" or "BugFixer." The user can reject the selected/provided search area. In this case, such decision is equal to the selection of all search areas. If at least one search area is selected, the search is performed in this search area. Class instances acts as required Items (which are associated with search word). "Michael," "Morgan" (FIG. 1) are another example of Class instances "Man"; "products:Product1," "products:Product2," "products:Product3" from the code below are instances of "example:Product" Class.

As mentioned above, the system offers two auto-complete variants: "Morgan" and "Mona" (see FIG. 1) to the user after the user has entered the part or search word, for example, some characters "Mo" (assuming that the user had in mind the word "Morgan"). The user can select at least one of them (or all of them), so the system will start the Item search process for selected variants.

As mentioned above, data can be stored in the form of triples or n-tuple. The data search terms can be implemented in the triples, but all triples related to data for the search must be known. The autotag usage is more convenient way for data search. Further the example for autotag description/definition and the autotag values searching process is provided. Also, an example of the Item search by autotag values is provided. The following source code is written in the N3.

The N3 is based on RDF standards and is equivalent to RDF/XML syntax, but have extra features like rules and formulas.

What follows are examples of implementation of the invention in the form of source code, each line starting with the symbol "-".

@prefix cmw: <http://comindware.com/logics#>. Herein the "http://comindware.com/logics#" for the "cmw" prefix is defined. The @prefix directive binds a prefix to a namespace URI. It indicates that a qualified name (qname) with that prefix will thereafter be shorthand for a URI consisting of the concatenation of the namespace identifier and the bit of the qname to the right of the colon. <"http://comindware.com/logics#"> is uniform resource identifier (URI), which is represented by a uniform resource locator URL, which refers to resource identified as comindware.com/logics# whose representation, in the form of HTML, is obtainable via Hyper-Text Transfer Protocol (http) from a network host whose domain name is comindware.com. Once set up, a prefix can be used for the rest of the source code. Everything, be it Subject, Predicate, or Object, is identified with a URI.

@prefix autotag: <http://comindware.com/ontology/autotag #>.

@prefix xsd: <http://www.w3.org/2001/XMLSchema#>.

autotag ontology. From here the ontology example for the autotag is started. According to the syntax of the language, comments describing a particular block of the document follow the "#" sign. The comments can be enclosed as "##" as well.

autotag: Autotag a cmw:Class;

When it is necessary to define a new vocabulary it is possible to define new classes of things and new properties. The property which tells what type something is rdf:type which can be abbreviated to N3 to just "a".

Classes just tell about the thing which is in them. An Object can be (represented, described) in many classes. Any sort of a hierarchical relationship is not required. If there is a relationship between two classes it is possible to state it. See properties of classes in the RDF Schema (http://www.w3.org/TR/rdf-schema/) and OWL vocabularies (http://www.w3.org/TR/owl-guide/or http://www.w3.org/TR/owl2-overview/). As would be appreciated, the invention can be used with triples, quadruples, and so on. For purposes of examples, triples are used.

cmw:property autotag:name,

Here the shortcut is used for the same subject: a semicolon ";" introduces another property of the same subject.

autotag:predicate, autotag:value.

Here is shortcut is used for the same subject: a comma introduces another Object with the same Predicate and Subject.

autotag:name a cmw:Property;

cmw:propertyType xsd: string.

autotag:predicate a cmw:Property;

cmw:propertyAttributes cmw:multivalue;

cmw:propertyType cmw:Property.

autotag:value a cmw:Property;

cmw:propertyAttributes cmw:multivalue;

cmw:propertyType autotag:Value.

autotag:Value a cmw:Class.

Following are the examples for the autotags definition:
auto tag definition examples.
@prefix example: <http://comindware.com/examples#>.
Bug ##
example:Bug a cmw:Class;
cmw:property example:bugSeverity.
The Enumeration (enum) autotag ##. The autotag with the property as an autotag type, and this autotag property is a list of specific values (in other words, the autotag for a property, and the property consist of list of values). An enumerator (an enum) can be used as the list of values. An example of such enum is a bug or task importance/priority: "bugSeverity:low," "bugSeverity:medium," "bugSeverity:high."
@prefix bugSeverity: <http://comindware.com/examples/bugSeverity#>.
example:bugSeverity a cmw:Property;
cmw:propertyName "Bug Severity";
cmw:propertyDescription "Serverity of the bug";
cmw:propertyType cmw:enumProperty;
cmw:valueVariant (bugSeverity:low bugSeverity:medium bugSeverity:high).

Herein the bug severity is a property. In the computer terminology the "bugSeverity" is an instance of the "Property" Class. The name of the property (bug severity) is "Bug Severity." The type of the property is "enumProperty." The property can have a description, such as "Severity of the bug," which can be used for displaying by the GUI as hint/additional information for a user. This hint can be represented as a text, which will be visible when the user will hold the mouse over some GUI element without clicking on it. The bug severity has values ("valueVariant"). In this case, the bug can have a low severity, a medium severity and a high severity (which are represented as "bugSeverity:low," "bugSeverity:medium" and "bugSeverity:high").

Each of the bug severity value (low, medium and high represented as bugSeverity:low, bugSeverity:medium, bugSeverity:high) is an instance of the "ValueVariant" Class:
bugSeverity:low a cmw:ValueVariant;
Each bug severity value can have a name (as well as property from the source code block provided above):
cmw:variantName "Low".
bugSeverity:medium a cmw:ValueVariant;
cmw:variantName "Medium".
bugSeverity:high a cmw:ValueVariant;
cmw:variantName "High".
Further, the autotag will be created for the bug severity.
example:bugSeverity Autotag a autotag: Autotag;
Herein the bug severity autotag is declared as the autotag.
autotag:name "Severity";
autotag:predicate example:bugSeverity;
From now the bug severity will be used as an autotag predicate.
autotag:value bugSeverity:low, bugSeverity:medium, bugSeverity:high.
Herein each bug severity value (low, medium, high) is the value of the bug severity autotag.
example:Product a cmw:Class;
cmw:property cmw:title.
auto tag for reference to other Item
example:Bug cmw:property example:product.
example:product a cmw:Property;
cmw:propertyName "Product";
cmw:propertyDescription "Product for which the bug is found";
cmw:propertyType example:Product.
example:productForBugAutotag a autotag: Autotag;

Herein the product for bug autotag was declared/created. In the computer terminology this triple can be interpreted as: the product for bug is an instance of an autotag Class.
autotag:name "Product";
autotag:predicate example:product.
The product is the predicate of autotag now.
Herein first variant of defining autotag values for references (enum properties)
direct definition
@prefix products: <http://comindware.com/examples/products#>.
In the following lines, the Product1, Product2 and Product3 will be defined as the instances of the Product Class. Also titles (names) will be assigned to them.
products:Product1 a example:Product;
cmw:title "Project Management Software v1.0".
products:Product2 a example:Product;
cmw:title "Case Management Software v1.0".
products:Product3 a example:Product;
cmw:title "Case Management Software v2.0".
example:productForBugAutotag autotag:value products:Product1,
products:Product2, products:Product3.

Autotag values can be defined manually or can be automatically found. In the lines above, Product1, Product2 and Product3 were defined directly/manually as the autotag values. The manually created autotag values must be created each time the new Item is created or changed. Also, if the Item is deleted by the autotag(s), the autotag values must be deleted as well. Rules can be used to avoid the manually autotag values creation/definition.
the second variant of defining autotag values for references (enum properties)
The rule definition autotag values can be used instead the direct definition of autotag values. The rule definition method is a more acceptable method to define autotag values.

It should be noted that the meaning of expressions written in N3 with facts and rules can be easily understood without programming knowledge. In this description of the invention the parts of statements are named as descriptive names. So "creatorAutotag" is an author/creator of an autotag; "example:creatorAutotag a autotag:Autotag;" means the "example:creatorAutotag" is autotag. "cmw:creator a cmw:Property;" means the creator is the property; "cmw:creator cmw:propertyName "Created By;" means that "Created By" the name of the property; "cmw:creator cmw:propertyType cmw:accountProperty;" is an account which is a type of the property; example:creatorAutotag autotag:name "Created By" means the "Created By" is the name of the autotag, etc. Thus, the code is described in this invention can be used as a description of the features of the invention.

For example, the "productForBugAutotag" part of a statement can be interpreted as "The product for the Bug Autotag" or as "The Autotag with the name "Product for Bug." In other words, "The Autotag, which is associates the Product with the Bug." An another example is the "cmw:propertyAttributes", which can be interpreted as attributes of a property or property attributes. One more example: the "creatorAutotag" part of the statement can be interpreted as the Autotag which name is "Creator," or author—i.e., the person who creates something, a task or a bug, for example.

As mentioned above, N3 is based on RDF standards and equivalent to RDF/XML syntax, but has extra features like rules and formula. Rules can be written in N3, OWL, XNL, and other.

A simple rule (N3 rule) might say something like: if X is a part of Y, and if Y is a part of Z then X is a part of Z, or "{?x rdfs:partOf ?y. ?y rdfs:partOf ?z}=>{?x rdfs:partOf ?z}."

The combination of the "{" and "}" brackets and "=>" is the rule. The curly brackets here enclose a set of statements and represents a formula. All formulas are enclosed by the curly brackets. Apart from the fact that the Subject and Object (Subject formula is represented by two statements and Object formula is represented by one statement) of the triple are formula, the example shown above is just a single statement. A formula is a part of the rule, and can be represented by a set of statements (at least by one statement), wherein the rule is the statement as well, and wherein the statement is a triple.

In the above example of the statement, the "?x" is a variable (or it is an unknown value, desired value). Note, the "?x" is not always represented as the desired variable, instead the known part of the statements (as URI) "?x" can be used for authentication of a fact. As mentioned above, any data, such as entity, event, and other can be described by a triple. A triple can describe the fact as well, for example, "Bill is a Man," "John is a Man," "John's position is a manager."

If the triple looks like this: "?x is Man," then, all things (which satisfy the statement) will be found. But if the part of statement, such as "Bill" and "John" will be used as an input for "?x," then this statement can be checked for "true" or "false," i.e. this triple(s) is stored in the triples. For the current example, after the substitution of "Bill" and "John" to the "?x", following statements: "Bill is a Man" and "John is a Man" will be truthful, for as longs as such triples are stored in the database. If the statement "?x position is a manager" is used, and "John" and "Bill" are be used as input parameters for "?x," then only statement "John's position is a manager" is interpreted as true, but "Bill's position is a manager" statement is false, because such triple is not stored in the database (and it is not deduced from triple(s)). If none of the "?x" variable are bound with value in the triple "?x is Man," then this triple is used for search anything that fit to this triple, i.e. "Bill" and "John" will be found.

In the example of the described above, the "=>" is used here as a special predicate, means "implies". This is used to link formulas. It is actually the short hand of the URI log:implies, or: http://www.w3.org/2000/10/swap/log#implies. When two formulas are linked with "log:implies", it is a rule, and as mentioned above, all rules are just a different kind of statements. The formula provides the things that can be represented using the current RDF/XML; these rules are not part of standard RDF syntax.

rule definition.
{
?instance a example:Product.
}=>{example:productForBugAutotag autotag:value ?instance}.

The left part of this rule says that all instances of the Product Class are found in all stored triples. The right side of the equation says that all values found in the left part of the formula are applicable/possible values for the autotag "productForBugAutotag".

In this case, the following instances will be found: "products:Product1," "products:Product2" and "products:Product3"—i.e., the instances that were described by triples above: "products:Product1 an example:Product;", "products:Product2 an example:Product;", "products:Product3 an example:Product;".

In other words, this is an indirect definition of the values for the autotag "productForBugAutotag."

As mentioned above, the directly defined values for the autotags must be updated by a software developer (or someone else with the necessary permissions) each time after the Item creation or change. These values must be deleted after the deletion of corresponding Items. So, if the "Product4" Item is be added (for example, if the new triple "–products:Product1 an example:Product;" is created or generated automatically and optionally will be added to a database) the autotag "example:productForBugAutotag autotag:value products:Product1, products:Product2, products:Product3." must be changed to the triple "example:productForBugAutotag autotag:value products:Product1, products:Product2, products:Product3, products:Product4." After the new Item is created by the user, the new values are found for the autotag by the engine 305 by using the "rule definition" method (herein the autotag values are the result of the software processing of the data/triples).

For example, if the new product is created, then it is transformed by the engine 305 to the at least one triple, like the following triple: "products:Product4 a example:Product;", and by other necessary triples, such as "products:Product4 cmw:title "Case Management Software v2.5" the "Event Filter-Interceptor Of Actions With The Item" 310, which is a part of the engine 305, intercepts all events with the Items. The "Structured Data Processing Module" 315, which also is a part of the engine 305, translates all events with the Items to triples). The applicable/possible values, which corresponds to added Item, is found for the autotag during the Item creation.

Note that triples for new or changed Item can be added to the database (or to the Ram and/or cashed) during the Item parameters adjusting—i.e., if at least one of the Items is created or changed, then one or more triples can be generated and stored in the database before the saving of the Item. This set of triples describes the Item, the Item's relations with other Items, data storage, where the Item triples are stored. Note that these mentioned triples can be created/written manually by a developer, by a user, by a database administrator, and etc. Also, such triples can be created by the software.

The Item saving (storing to RAM, HDD, to a Network/Cloud storage, etc.) can be an intermediate saving, for example, when the Item parameters and attributes are stored during the Item adjusting. Also, the complete saving can be performed when a user, a system administrator, a developer, a database user or administrator decides if the Item is modified/adjusted/configured enough for the current purposes. Note that the Item and its parameters can be changed/re-configured in the future, for example, new ontology can be added, the Item can be marked as an autotag and so on.

Note, applicable/possible values for the autotag can be found not only after the Item creation, but also on the search request (the search request(s) will discussed below) from the user (actually, the system send the request to find the data (translated from the user search request)→the autotags are found for these data→autotag values are found with using the autotag predicates→autotag values are used to find Items to form an answer to a query from the system for searching). So the described above rule is used to find autotag values (so called the calculation of auto-tags) which are necessary to find Items for search words.

Thus, the rule definition method (indirect definition method) replaces the manual adding of the autotag values. Note, the rule definition method does not limit the possibility of the manual adding of triples, including part of statements, including properties/attributes and values. Also note that the manual adding of triples does not limit the possibility of the automatic adding of triples, including part of statements, including properties/attributes and values.

The combination of manual and automatic/software methods for triple adding/creation can be used for a fine-tuning/more detailed description of Items or the system as a whole (for example, such a system may be a system for tracking and bug fixing in a customer service system, a personnel management system, etc.). Also, it can be used for the automation of the Item describing/definition, for example, in case of duplicated parameters of Items, using the parameters of similar/related items, similar triples, including ontologies. The ontologies are used for Item describing information that can be obtained by the calculation (from the rules) and can be hard-coded in the form of axioms. It is possible to use multiple ontologies for an Item, and a single ontology can be used for the some Classes, for example, for similar Classes.

With regard to rule definition method, it should be mentioned that another rule can be used for a specific case, namely for the bug severity autotag: {example:bugSeverity cmw:valueVariant ?list. ?list list:member ?instance.}=>{example:bugSeverityAutotag autotag:value ?instance}. This rule is used to find the following autotag values: bugSeverity:low, bugSeverity:medium and bugSeverity:high for the bug severity autotag.

Further, another example of the autotag (for author) includes autotag values search:

User autotag example applicable for all users (for all predicates with a creator type)
@prefix account: <http://comindware.com/ontology/account#>.
example:Bug cmw:property cmw:creator.
cmw:creator a cmw:Property;
cmw:isSystem true;
cmw:propertyName "Created By";
cmw:propertyDescription "Author";
cmw:propertyType cmw:accountProperty;
cmw:propertyAttributes cmw:predefined, cmw:readonly.
Example 1 direct definition
example:creatorAutotag a autotag:Autotag;
autotag:name "Created By";
autotag:predicate cmw:creator.
Specification of values by formula for particular autotag
{
?account a account:Account.
}=>{example:creatorAutotag autotag:value ?account}. In this rule all accounts are found of "account:Account" type, and all found accounts will be used as creatorAutotag autotag values.
Example 2 indirect definition by attribute.
autotag:accountTagAttribute a cmw:PropertyAttribute.
cmw:creator cmw:propertyAttributes autotag:accountTagAttribute.

The attribute of the property (some kind of a flag) is introduced for accountTagAttribute in these two lines. Each bug creator is marked by this flag, i.e., every creator will have accountTagAttribute attribute of the property.

define account autotags via formula for all properties marked with "accountTagAttribute".
{
?property cmw:propertyAttributes autotag: accountTagAttribute.
?property cmw:propertyName ?name.
}=>{
?property a autotag:Autotag;
autotag:predicate ?property;
autotag:name ?name;
autotag:type account:Account.
}.

The formula is in the left side of this rule, and the formula consists of two statements. The search for all things, which have the accountTagAttribute as a property attribute, is performed in the first statement. The search for all things, which are related with propertyName predicate, is performed in the second statement, and these things are stored to "?property" and "?name" variables. Thus, all things found and stored to variables are given to the right side of the rule. In other words, all pairs for propertyName predicate will be found and then given to the right side of the rule.

The first two statements on the right side of the rule say that all things found on the left side of the rule are autotags, and are autotag predicates. Third statement consist of usage of the data stored in ?name variable as autotag names. Fourth statement declares the Account as autotag type.

As mentioned above, such method allows for define/declare the autotag properties, names, types, predicates and so on.

The example of the indirect definition of autotag values is described below:

autotag values for all autotags marked with type account.
{
?autotag autotag:type account:Account.
?account a account:Account.
}=>{?autotag autotag:value ?account}.

A search of all things with an autotag type account, is performed in the first statement of the left side of the rule. A search of all things that are accounts is performed in the second statement of the rule, i.e. the Items used as instances of the account:Account Class.

All things stored in the "?account" from the left side of the rule are the autotag values in the right side of the rule.

Up to this point only one predicate for autotag was described, but the autotag can have much more predicates than one, so the search area by autotag can be considerably extended. All predicates of the autotag belong to the same general group, which, in turn, can also be divided into several groups to extend the search possibility.

Here is the example for definition of several predicates for one autotag ("example:userRelatedToBugAutotag" in this case):

example:bugFixer a cmw:Property;
cmw:propertyName "Fixed By";
cmw:propertyDescription "Person who fixed the bug";
cmw:propertyType cmw:accountProperty.
multiple predicates tag definition
example:userRelatedToBugAutotag a autotag:Autotag;

Herein the autotag with the URI "example:userRelatedToBugAutotag" is created. This autotag is used to establish the relation(s) between a person and a bug. Such relations can be represented by the bug and bug creator (in some embodiments of the invention the bug creator is the person, who detected the bug and/or created the bug Item). A developer, a bug-fixer, a user, DB or system administrator, an operator and others can be such a person. The following statements show that some persons can be related with the bug, for example, a bug creator, and a developer/or a bug fixer, who will fix this bug. In other words, in this case, the bug can be related with or assigned to persons responsible for this bug.

autotag:name "Related User";
    autotag:predicate cmw:creator, example:bugFixer.

Herein two autotag predicates "cmw:creator" and "example:bugFixer" are defined for the autotag "example:userRelatedToBugAutotag." The autotag predicates are the characteristic of the autotag. Based on the predicates it is possible to say which search area the autotag belongs to. In other words, autotag predicates of the specific autotag belong to one type. In this example cmw:creator and example:bugFixer autotag predicates that identifies the individual/person (for example, for the "userRelatedToBugAutotag" autotag). In the previous example, the values of the ?property was obtained with using the "?property cmw:propertyAttributes autotag:accountTagAttribute" triple can be seen that there is one ?property type is used. Further in the example, the values of the ?property are used as the autotag predicates.

A specification of values by the formula for the particular autotag
    {
    ?account a account:Account.
    }=>{example:userRelatedToBugAutotag autotag:value ?account}.

All things (that are accounts here) are searched on the left side of the rule. All found things (that were written to "?account") are autotag values for the example:userRelatedToBugAutotag autotag on the right side of the rule.

Query Examples. The information for a search which was entered by the user (in a GUI) will be converted to a query, for example, after the user clicks on the button "Search".
    @prefix query: <http://comindware.com/ontology/query#>.
    # Query Example for "Or" and "And"
    # Find by Product1 or Product2 and BugSeverity:High //exact Further an example of a search request for bugs, that have high severity status and related to "Product1" and "Product2" products, is provided.

{?x example:product ?product.
    or {?product=products:Product1}
    or {?product=products:Product2}.
    ?x example:bugSeverity bugSeverity:high.
    }=>{query:42 query:result ?x}.

All pairs with the common "example:product" predicate are found in the first statement of the left side of the rule. Second statement is a complex statement and is written using Comindware Language. In this example, Comindware Language allows to use "or" logical operator for "products:Product1" and "products:Product2" as "?product" variable. In other words, first statements written above can be described as: find all pairs "?x+?product" with "example:product" predicate, wherein "?product" variable can be "products:Product1" value or "products:Product2" value. All things (bugs in this case) with the high severity status will be found in the third statement of the rule (on the left side of the rule).

On the right side of the rule all found things are written to "?x" variable and are the result of the "query:42" request.

Herein the "query:42" is the interpretation of the user's search request. The above example describes the search of all bugs for "Product1" and "Product2." This example can be considered as following: a user enters "high" as a search word to the GUI textbox; the system associates the entered word with at least one statement element (in this case with "bugSeverity:high") based on the statements analysis. The statement "bugSeverity:high cmw:variantName "High" can be one of such analyzed statements. The statement element will be related by the system with the "autotag:value" predicate (it is evident from the "example:bugSeverityAutotag autotag:value bugSeverity:low, bugSeverity:medium, bugSeverity:high." statement).

Then, the system will find all Items by using the mentioned rule for at least one appropriate autotag predicates (in this case "example:bugSeverity" predicate from the "example:bugSeverityAutotag autotag:predicate example:bugSeverity;" statement). Note that any type of a machine/processor/application readable request/query can be used. Herein the query characterizes and describes the request from the user, and the result(s) of the autotag search is stored in "?x" variable.

The following example is an alternative implementation of the search request for bugs, that have high severity status and related to "Product1" and "Product2" products.

{
    (products:Product1 products:Product2) list:member ?product.
    ?x example:product ?product.
    ?x example:bugSeverity bugSeverity:high.
    }=>{query:42 query:result ?x}.

Herein method with using "list:member" instead of "or" is implemented. As in the above example, first two statements can be described as: find all pairs "?x+?product" with "example:product" predicate, wherein "?product" variable can be "products:Product1" value or "products:Product2" value.

The following is the example of the search for all autotag predicates that are related with search word, and for all autotag values, which are used for the Item search.

Find by Product1 or Product2 and BugSeverity:High via query:autotagQuery
    @prefix list: <http://www.w3.org/2000/10/swap/list#>.
    in ?tag, ?values.

In this example, the line "in ?tag, ?values." according to used syntax means that values "?tag" and "?values" must be defined before they will be used in formulas. In other words in the example below these variables are defined in the statement "(example:bugSeverityAutotag (bugSeverity:high)) query:autotagQuery ?x.".

{
    ?tag autotag:predicate ?predicate. #for all autotag predicates.
    ?values list:member ?value. #with all autotag values
    ?x ?predicate ?value. #find all Items.
    }=>{(?tag ?values) query:autotagQuery ?x}.
    {
    (example:productForBugAutotag (products:Product1 products:Product2)) query:autotagQuery ?x.
    (example:bugSeverityAutotag (bugSeverity:high)) query:autotagQuery ?x.
    }=>{query:42 query:result ?x}.

The second rule is similar to the above example of query/search request for the Item search. The Item search itself is processed in the first formula, in which found items stored in the "?x"; and "?values" and "?tag" from the second rule are used as the input parameters. In other words the first rule is called from the second rule with the specified parameters—values of the "?tag" and "?values".

On the left side of the first rule: the search of the pairs with common "autotag:predicate" predicate are searched. And statement elements ("example:productForBugAutotag" and URI "example:bugSeverityAutotag") are used as input parameters for ?tag. Due to the fact that the above source code contains "example:bugSeverityAutotag autotag:predicate example:bugSeverity;" triple, the "example:bugSeverityAutotag+example:bugSeverity" pair will be one of the searched pairs, and "example:productForBugAutotag+example:product" pair will be a second searched pair, as can be seen from the provided source code.

In the right-hand side of the first rule the content of the brackets (?tag ?values) is an array/list of two elements/variables. Note that a list or sequence is an abstract data type that implements a finite ordered collection of values, where the same value may occur more than once. An instance of a list is a computer representation of the mathematical concept of a finite sequence; the (potentially) infinite analog of a list is a stream. All found things (and stored to the "?x" value) on the left side of the second rule is the result of the "query:42" search request.

Note that in the first statement of the left side of the second rule the "(example:productForBugAutotag (products:Product1 products:Product2))" is the list of the two elements, where first element is the "example:productForBugAutotag" and the second element is the list/array consisting of "products:Product1", "products:Product2" elements.

The example of a transitive autotag is provided below. The transitive autotag can be used for the Item search, where the Items are related with other Items. For example, such autotags can be used for Item search in the Item group. The Item group can be created for some Items to provide links/relations of Items. In this case, such linked/related Items (for example, linked by at least one group/family) can be found by a characteristic, which further can be used as an autotag predicate. In this case the "example:productFamily" predicates can be used for establishing the Item belonging to at least one group/family. Note that some common Item attributes/properties can be described and used for all Item included into the group, for example, bug or task priority/severity, belonging to the same product, etc.

Transitive auto tag
  example:ProductFamily a cmw:Class;
  cmw:property cmw:title.
  @prefix productFamilies: <http://comindware.com/examples/products/families#>.
  productFamilies:Family1 a example:ProductFamily;
  cmw:title "Project Management Products."
  productFamilies:Family2 a example:ProductFamily;
  cmw:title "Case Management Products".
  example:Product cmw:property example:productFamily.
  example:productFamily a cmw:Property;
  cmw:propertyName "Product Family";
  cmw:propertyDescription "Family of Product";
  cmw:propertyType example:ProductFamily.
  products:Product1 example:productFamily productFamilies:Family1.
  products:Product2 example:productFamily productFamilies:Family2.
  products:Product3 example:productFamily productFamilies:Family2.

In this part of the code the "example:ProductFamily" statement element is determined as Class. Further "productFamilies:Family1" and "productFamilies:Family1" is determined as an instances of "example:ProductFamily." Also, a concept of the product family is introduced. Such families can be used for Item search (products in this case), which is included into a family. It can be implemented by declaring the statement element property and used for searching for bugs that are related to family, for example, products that belong to Enterprise products. Such properties can be used as autotag values for Item search. As mentioned above, the Item has the above attributes, such as a name, attribute properties, property types and etc. Note that some attributes can be assigned to the Item by default, for example, by using the ontologies that can consist of the facts and/or the rules.

Also note, additional rules (outside the ontologies) can be used. For example, the Item attribute name can be assigned from the system data, external application/module, combined from the other Item name or attribute and property. The counter (each Item can be numbered according to a counter) or current date, for example, can be used for adding to the Item attribute, for example, Item001, Item002 or Bug_10_10_2014.

define transitive autotag variant 1—via calculated property
  example:transitiveBugToProductToFamilyPredicate a cmw:Property;
  cmw:propertyAttributes cmw:readonly, cmw:calculated;
  cmw:propertyType example:ProductFamily.
  {
  ?bug example:product ?product.
  ?product example:productFamily ?family.
  }=>
  {?bug example:transitiveBugToProductToFamilyPredicate ?family.}.

The result of this rule will consist of "?bug" bug relation with products (or more precisely a "?family" product family) by the "example:transitiveBugToProductToFamilyPredicate" predicate, and besides the "?bug" "family" search is provided on the left side of the rule.

Further, an example of the autotag definition is provided for the property introduced above.
  example:Bug cmw:property example:transitiveBugToProductToFamilyPredicate.
  example:productFamilyForBugTransitiveAutotag a autotag:Autotag;
  Further the autotag name and autotag predicate is defined:
  autotag:name "Product Family for Bug";
  autotag:predicate example:transitiveBugToProductToFamilyPredicate.
  {
  ?productFamily a example:ProductFamily.
  }=>
  {example:productFamilyForBugTransitiveAutotag autotag:value ?productFamily.}."

Figure 5:
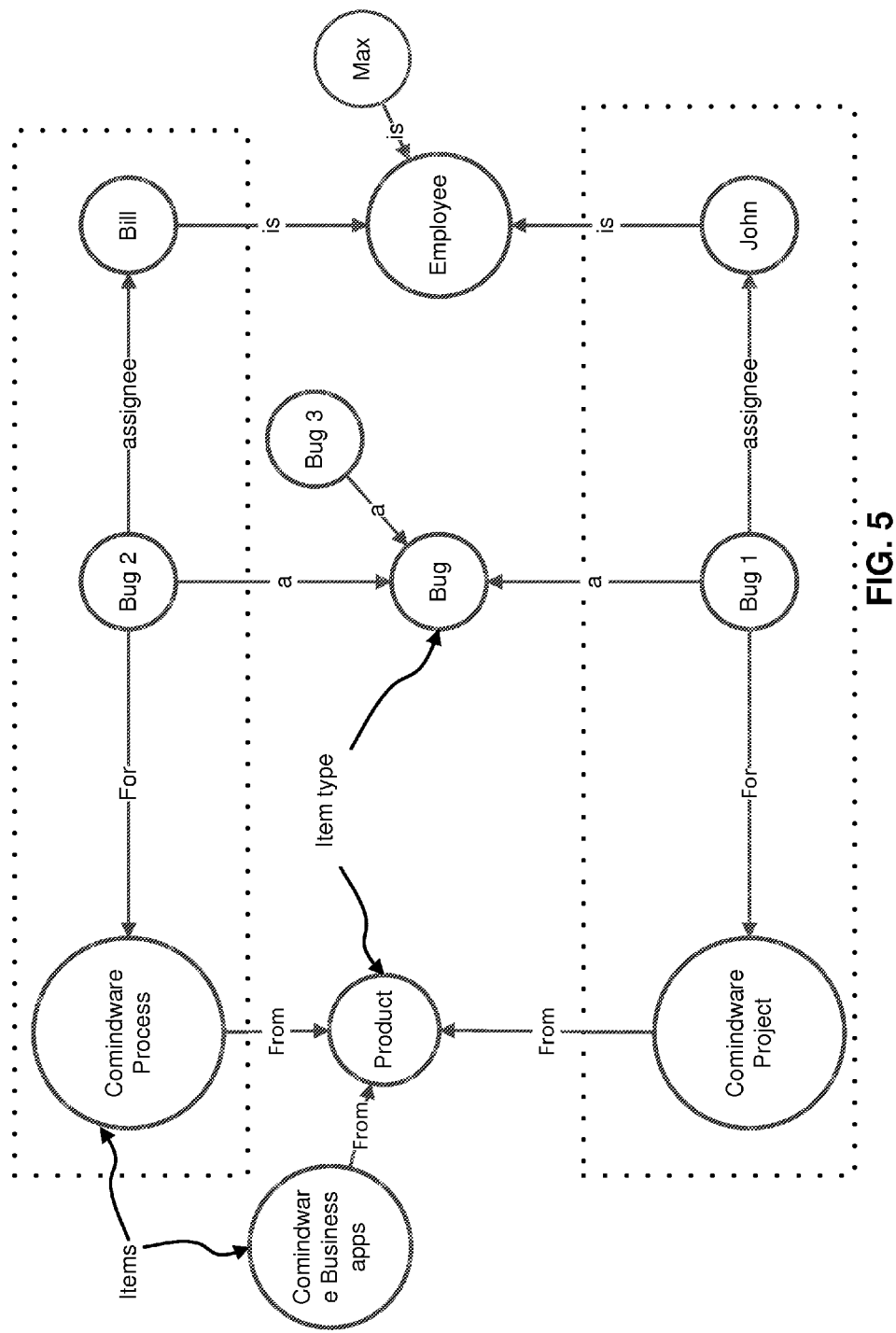
FIG. 5 illustrates an example of data relationships as it applies to searching the Items.
Figure 6:
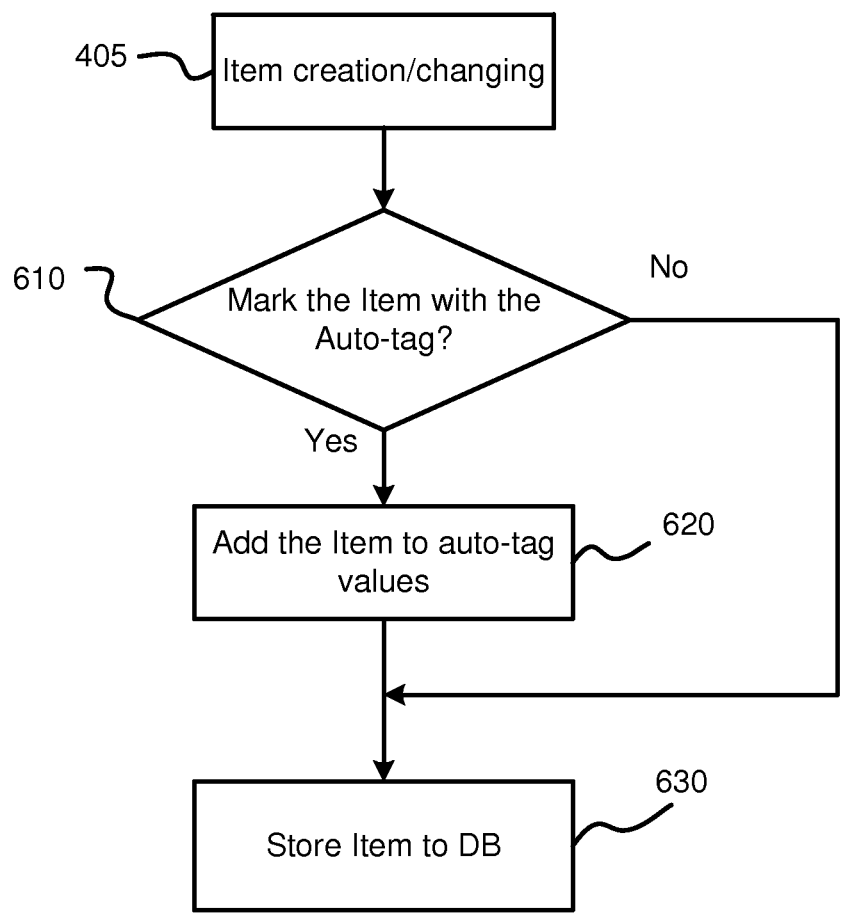
FIG. 6 illustrates the process of data processing during the Item creation of the Item.

This rule is another demonstration of an automated search for autotag values without having to specify them manually, although the implementation of the present invention also allows the use of hand-written autotags and their predicates, values, etc. It is worth noting that one of the implementations of the present invention allows for combining all of them. In the above examples, the method of Item search across all possible autotags and all autotags that are associated with the search word. However, the user can select at least one of the search area (FIG. 5), which can be used for the Item search. The Item search in the defined search area can be implemented by the rule usage.

According to the exemplary embodiment, autotag predicate names can be displayed to a user as search areas via a GUI. For example, the entered by the user word "high" is the name of "bugSeverity:high" (as can be seen from the statements "example:bugSeverity cmw:valueVariant (bugSeverity:low bugSeverity:medium bugSeverity:high)." and "bugSeverity:high cmw:variantName "High".".). In turn, the importance/severity property of the bug has the "Bug Severity" name (see the statement above: "example:bugSeverity cmw:propertyName "Bug Severity";"). This name can be used as the search area. Also, as can be seen from the source code, the severity of the bug is an autotag predicate (see the statement above: "example: bugSeverityAutotag autotag: predicate example: bugSeverity;"), and the autotag has the "Severity" name (the statement from the source code: "example: bugSeverityAutotag autotag: name" Severity ";"), which can also be shown to the user as the search area.

The search by autotags can be processed with using at least three ways:
- a user knows the Item property by which he wants to search; for example, by the "assignee" or by the "manager." If the user selects "manager," the system will offer the one of the autotags associated with the selected Item property to the user, for example "managerName." After the user selects the appropriate autotag and, then, selects the user name from the list, the system will store the autotag and autotag value (also autotag predicate can be stored). These stored data can be used for further Item search and/or for search of all Items related with current Item.
- a user knows exactly who/what needs to be found (i.e., he knows the name of the Item). The user can enter "Bill," and the system will provide him such autotags as "assignee," "manager" and other autotags associated with the entered search word "Bill." In this case, the Item name is known, and appropriate autotags are found for it. Next, the search process is carried out as described in the previous paragraph.
- the user can enter the search word, but he does not know which of search areas will satisfy him, so he can select the search in all autotags by using the logical operator "OR". In this case, all search results (predicates of which are related with the search word) will be shown to the user.

Several autotags can belong to an autotags set(s). In other words, the autotag set can be created/described for the bug severity, for product and so on. Values of autotags from the autotag set will belong to this autotag set. Depending on whether the search is performed by the Items belonging to one or different sets, the autotag searches are performed using the logical operators "AND" and "OR." The operator "OR" is used to find Items with autotag values from the same autotag set. For example, if the user want to find a bug with a severity "High" and "Low," then the operator "OR" will be used and the request can be interpreted as "search for all bugs, which priority is High OR Low." The "AND" operator usually is used for the combining the search requests from the different autotag sets. In the framework of this invention, the autotag can be determined by the autotag predicate, autotag property, Item property.

Item's content can be analyzed during the Item search, i.e., the Item main body text, a content of Item text fields, attached documents can be parsed during the Item search. Parsing or syntactic analysis is the process of analyzing a string of symbols, either in a natural language or in computer languages, according to the rules of a formal grammar. A search in such elements can be provided instead of the parsing. Such search or parsing can be provided by third-party modules (an additional search engine, which can provide a full search in Items, for example). However, autotags can be created for such search, for example for the data search in Item content.

These autotags can reflect the character or emotions of the data/content. Such autotag values can be described based on the Item data analysis, for example, such data can consist of Item description, in Item attachments, and etc. So if the Item data or attachments consist of content elements (words or a set of words) "A", "B", "C" and "D," then the "ABCDE" can be considered as the Autotag value. Such summary content can be compressed before being used as an autotag value, for example, it can be hashed. Such content elements can be common elements in various contents of Items. So conclusions can be made based on the Item data, and these conclusions can be used as autotag values. A semantic analysis of the Item data can be used for analysis discussed above.

It should be noted that the above described example of the invention (when a user initiates a process of Item search) is also called on-demand and on-the-fly search. Note that the previously found autotags, autotag values and autotag predicates can be used in the next data/things search, which can be initiated by the user or by the system. Such found autotags, autotag predicates and autotag values can be used for searching the Items (which corresponds to the user search words and selected parameters), which have not been changed after the last search request.

In this case, the on-demand search method provides relevant search results, and it is not necessary to start the new search process. Note that the Items that have been changed after the last search can be marked in the list of the changed Items. The list of the changed Items can be used during the on-demand search to signal to the system for which Items the autotag values must be re-found and for which Items the autotag values are relevant.

Figure 3:
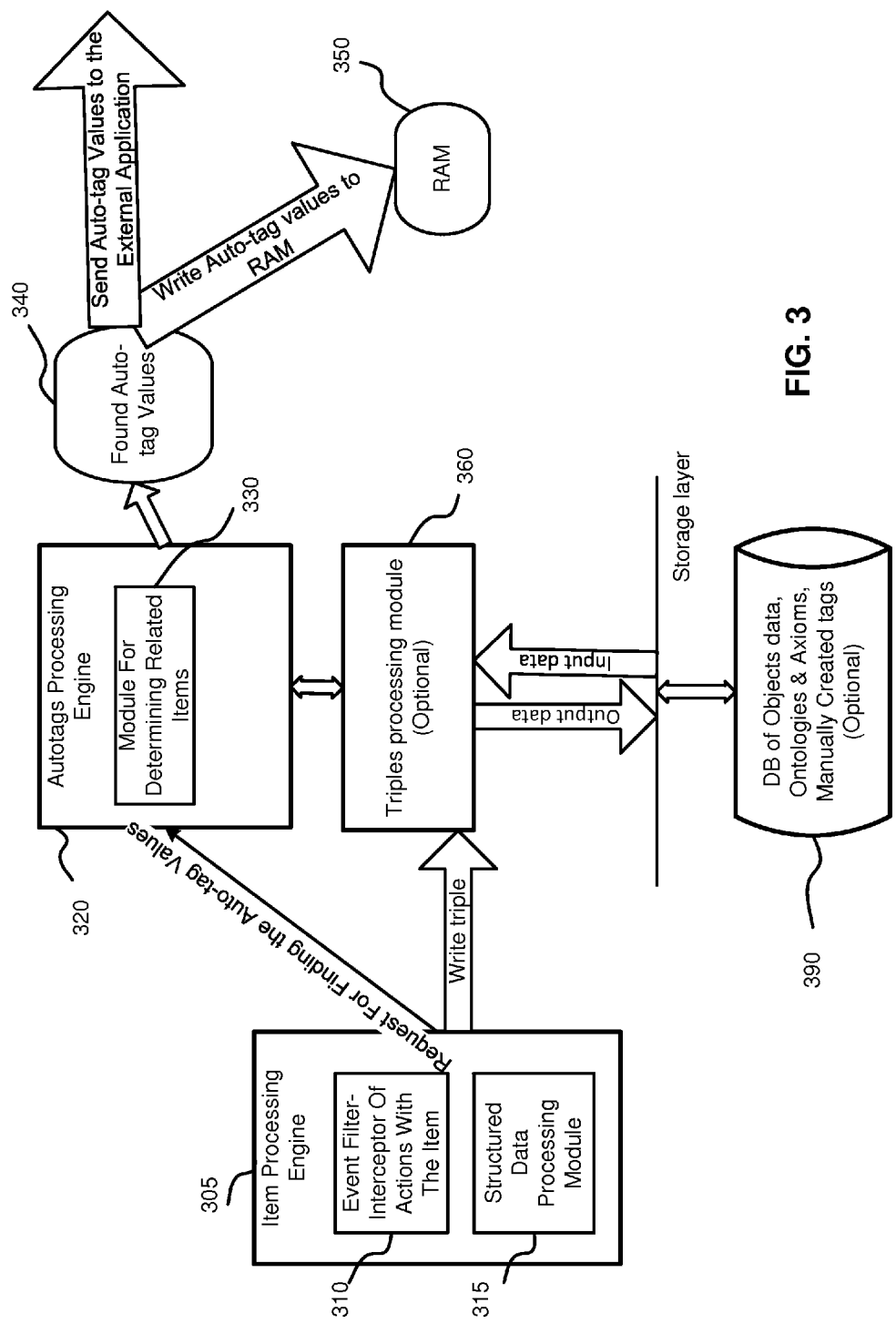
FIG. 3 illustrates a data processing algorithm, according to one embodiment of the invention.

FIG. 3 illustrates a data processing algorithm, according to one embodiment of the invention. The Item Processing Engine 305 coupled with a GUI is used to allow the user to create, delete or edit Items. The Engine 305, by using the Module 315, converts the user actions with the Items to triples and stores them into the Database 390.

The triples are stored into a database(s), which can be stored on the data storage, such as local data storage, cloud storage in cloud services, SAN, NAS, various web-services and others. Also note, any known data storing system (for example a data serialization can be used for storing the data, for example in xml format) can be used instead of a Database. The triples can be stored in the database format or in the format of triples using methods described in U.S. patent application Ser. No. 13/624,078 entitled "STORING GRAPH DATA REPRESENTING WORKFLOW MANAGEMENT", incorporated herein by reference in its entirety.

The user can create a new task with a title "Add new color image with the mobile device to the product folder" for "Maxim" employee (which is an assignee for it) and relate this task to a product, for example, "Comindware Process,"—i.e. it will link the task with the product to which the task belongs to. Also, the user can change the status (from "Opened" to "Closed"), title and other Item properties. In this case, the Engine 305 transform the result of the user actions to the triples, so, for example, the triple "Task status Closed" is created and replaces the triple "Task status Opened" in the database 390. Actions with Items (for example editing, creating, deleting, moving the Item between the groups and etc. by a user; or by a system, for example, an Item deleting after the three years after it was created; or by an application, for example, by a third-party application/module, such as "Comindware Project") are tracked by Event Filter-Interceptor Of Actions With The Item module 310. One of the purposes of this module is tracking the need for marking/unmarking the Item as a potential one for generating the auto-tag. As the example of the system/application initiated actions can be considered a bug automatically closing after the product (for which the bug was created) supporting is stopped. Another example of such actions is the bug creation (and/or a task creation for this bug) by the system/application after the bug is detected by the user or by the software debugger, or by "try-catch" function.

The Engine 305 also sends at least one request to the Autotag Processing Engine 320 for the Item search according to a search word. The request initiates the Item search process (in Engine 320) by using rules mentioned above for the search of the autotag values. The "query42" can be considered as an example of such request. At least one found Item is the result of the functioning of the Engine 320. Note the "null" result can be obtained from the Engine 320 if no Item was found during the Item search.

According to the exemplary embodiment, autotags, autotag predicates and autotag values can be stored to RAM, including optional caching of them. Such data stored in RAM can be used, for example, by GUI to display found Items, and for further Items search, which can be initiated by the user by using other search words and same or other search area(s). The search areas can be extended by the user.

Module for Determining Related Items 330 is responsible for determining the relations of Items with each other. The example of the Item relations is the "transitive auto tag" which is used for establishing the direct and indirect relations between the Items. The direct Items relation can be represented as a link between the two items, but the indirect Item relation—as a link to other Item through at least one another Item. The relations between Items can be established by using the rules and by using the description of the Items, Item properties and can be represented as autotag and autotag predicates.

Since the Item or Item properties can be changed during its lifetime, the same autotag values for the Item must be re-found. Here is an example of a case when new autotag values must be found again: a bug was detected in Product 1, which is a part of Family 1. After a certain amount of time, Product 1 was moved to Family 2. In this case, all found autotag values for bug must be re-found, because its relations with the Product 1 and Product 2 have been changed. Note that autotag values were previously found for the Items (Product 1 and Product 2) related with current Item (bug in this case).

The search for autotags, autotag predicates and autotag values for related Items is performed based on the data received from the module 330 (and data from the RAM) and from the database 390. As mentioned above, the result of previously searched Items and all data associated with them can be stored in RAM. The usage of the data from RAM can speed up the execution of the next search requests. The data from the database 390 can be obtained (and used by the Engine 305 and Engine 320) in the form of triples, a list of Items with relations, and in the other forms. The Item relations data (and related to them autotags, autotag values, autotag predicates) optionally can be stored in the database 390 (or to another database, which can be used for the related Item triples storing) or to RAM for further processing. For example, such Item relations data can be used for the second search request from the user or from the system.

The Autotags processing engine 320 uses the data from the module 330 and from the database 390 via the optional triple processing module 360. The optional module 360 is responsible for representation of the data from the database 390 in the applicable form for the autotag calculation engine, for example, if such data were stored not in the Subject-Predicate-Object format, but in the DB format. The data can be converted by DB means or modules instead of converting in the module 360. Note that the module 360 is responsible for applying the rules to facts from a database. The module 360 can be a part of the Semantic processor 840 (FIG. 8) and perform all its functions or part or them. Also, the module 360 is responsible for representation of the data from the Item Processing Engine 305 to the database format. The data from the Item Processing Engine 305 can be written to database 390 after the converting the data to appropriate database format if necessary.

Figure 4:
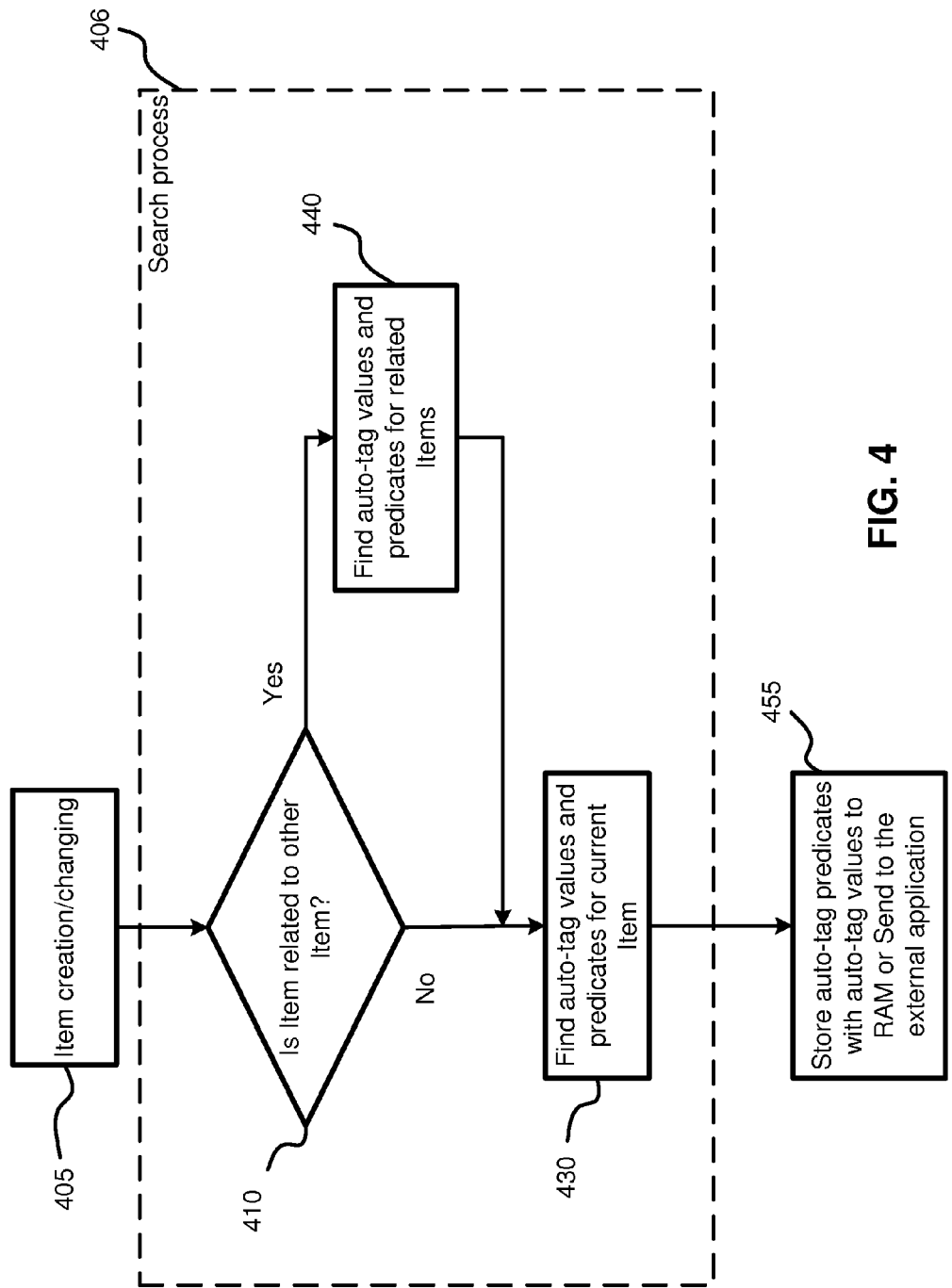
FIG. 4 illustrates a flowchart of the autotags finding for the changed Item and for related Items, according to one embodiment of the invention.

FIG. 4 illustrates a flowchart of the part of Item search process (406) comprising of autotags finding for changed or created Items. As mentioned above, the autotags and other data that are necessary for Item search process, can be found for related Items. The embodiment which does not employ on-demand search for autotags, autotag values and autotag predicates is depicted in FIG. 4. As mentioned above the autotags, autotag values and predicates can be found when the user asks to find the things with using the search words (herein autotag and other data will be found on-demand) or when the Item is changed or new Item is created. After the Item creation or changes (for example, by the user) in step 405 the process goes to step 410.

In step 410 the process determines if the current Item is related to other Items. The relations are established during the new Item creation, and during the associating and re-associating Items with each other (for example, the task can be re-assigned to other user, or linked to second Product, or the Product can be moved to other Project or Family and etc.). If the current Item is not related to other Items, then, in step 430, the process performs the search for the autotag, autotag predicates and values for current search words. Then, the process goes to step 455 wherein the found autotag, autotag predicates and autotag values for Items are stored to the RAM or to the Database. Note that steps 410, 430 and 440 are steps of the Item search process. Also note that the found autotag predicates and autotag values can be sent to the external application, for example, if the search request was sent by external application or the search result is necessary to be processed by the external application (for example, for displaying to users after the converting to a displayable format). Also note, autotag predicates and autotag values can be converted to the external application format.

If in step 410 at least one related Item is determined. The process moves to step 440 wherein the autotag values and predicates for related Items are found. Then, the process moves to step 430. Note that the previously found autotag values and predicates are deleted, if the user or system deletes corresponding to them Item. If the Item is changed, autotag predicates and values must be re-found. Also, autotag predicates and values must be found again for related Items as well.

Note that the method of the propagation of the autotags with weights can be added to the above implementation of the Item search, i.e. a weight can be assigned to the autotag predicate. This weight is used to Item search beyond the found autotag predicates through previously described Item search method by using autotag predicates.

Herein weights of autotag predicates and their usage are described. The plurality of predicates is used to describe an example of usage of weights of autotag predicates. In this example the predicates plurality describes family ties within the family. For example, a man has a mother, a father, a sister, a cousin, and a second cousin. The "relationshipAutotag" is created to describe the kind of relationship between family members: "motherForManRelationship," "fatherFor- ManRelationship," "cousinForManRelationship," "secondCousinForManRelationship" and "sisterForManRelationship" are predicates for this autotag.

A mother, a father and a sister are close relatives, but a cousin is a distant relative, and a second cousin is the most distant relative. The distance to the family tree of the Item (a person in this case) can be described by the weight of autotag predicates. The closer is a given relative to the Item, the higher the weight of the autotag predicate. Thus, motherForManRelationship, fatherForManRelationship and sisterForManRelationship predicates have a larger weight (for example, the weight is equal to 1), than a cousinForManRelationship predicate (the weight is equal to 0.7), but the weight of the secondCousinForManRelationship predicate will be smallest, and will equal to 0.3. In the above example, the sister, the cousin, the brother are Items.

Weights described above can be used for the search of such Items—i.e. it is possible to find Items by autotag predicates with weights that are more than 0.5. Here in the described example, the Items search is performed trough the following autotag predicates: motherForManRelationship, fatherForManRelationship, sisterForManRelationship and cousinForManRelationship, but secondCousinForManRelationship autotag predicate will not participate in this search.

Note that the weights can be assigned to autotag predicates manually and stored (i.e., for example, they can be stored to a database by a user, a developer, a database administrator, etc.) during the process of the Item creation and adjusting. Also, weights of autotag predicates can be calculated and assigned/added to them. The calculation of weights of autotag predicates can be performed by using rules and surrounding context, such as ontologies, current Item data and other Items data. For example, if the bug was created on Friday, the predicate weight for this bug can be higher. The calculated weight can be added to the autotag predicate. In on embodiment, calculation of weight of the autotag predicate can result in adding, increasing, decreasing of the weight of the autotag predicate (including the weight reduction to zero, which means that there is no weight of the autotag predicate or it means that the weight is infinitely small).

The name of the autotag predicate can contain the weight directly or indirectly: the heavyWeightMotherForManRelationShip predicate weight can have the weight equal to 1 ("heavyWeight" in the predicate name is associated with the unit weight), and averageWeightFriendForManRelationShip can have a weight equal to 0.5 (averageWeight"). Note that the weight in the predicate name can be specified directly, for example, WeightOneMotherForManRelationShip, Weight1MotherForManRelationShip, WeightHalfFriendForManRelationShip, Weight0Dot5FriendForManRelationShip.

Also note that the presence of certain words or phrases in the predicate name can affect the weight of autotag predicate. For example, words like mother, father, wife, sister, brother, important, interested, WOW, radiant, great, etc. can implement the higher weights for autotag predicates, while little, weak, flaccid, dark, cousin can implement the low weights. In other words, semantics (the meanings) of part of autotag predicates names can determine the weight of autotag predicates.

Here is one example of using of weights of autotag predicates for search order of Items. The search of Michael relatives (which is the second cousin of the man William) is performed by using the weights of autotag predicates. For example, the Items search (in this case, Items are relatives) is performed in descending order of weights of autotag predicates. In this case, the next of kin will be found first (mother, father, brother and so on). After that, distant relatives are found (mother in law, cousins, uncle's second nephew, etc.). Also, as mentioned previously, these found Items can be used after they are found or can be stored as elements of array (ArrayList) to RAM or to data storage.

The propagation can be used to specify at least one additional predicate, which also is involved in searching for Items. An autotag predicate can be used as propagation parameter (i.e., an additional descriptor). For example, autotag predicate "cmw:creator" can be complemented by the descriptor "propagWith", which means that the predicate is propagated through the following predicates "mainPredicate propagWith targetPredicates", through "example:bugFixer" predicate.

The weight for the propagation can be adjusted to avoid the weights calculations for duplicated relations with Items. For example, the bug has a text field "same_as_that_bug," i.e. duplicated relations exist and are stored in the database, or virtually presented as on-demand calculated relations/links. Virtual relations in this context mean the relations that can be found by using rules, ontologies, etc. For example, Bill changes same/identical bugs, so high weights will be assigned to Bill (if the propagation was not adjusted, i.e. the default propagation was used), because each bug affects another one.

To avoid this, the duplicates can be ignored and will be not used in Items search. In other words, the search system/search engine can consider such duplicated bugs as a one bug, or these relations between bugs are considered as a one relation. Note that in this context the weights of relations are considered but not the predicates weights—i.e., the supposed weight of the predicate is considered. Also, note that small weights can be also assigned to such duplicates, for example, the weight value can be equal to 0.00001, so it has a negligible effect for the sorting of found Items. Note that by the adjusting the values of weights, it is possible to build a flexible search system for Items considering the weight values. This search system is able to automatically distribute weights based on algorithms and/or previously received data.

The Item weight (and position in the sorted list of found Items) depends on the autotag predicate, which was used during the Item search, i.e. the Items with small weights (for autotag predicates with small weights) are positioned closer to the end of the sorted list of Items than Items with large values of weights. Note that the weights of autotag predicates are also used to establish the depth of the Item search. The weight of the predicates of the autotags and the search parameters determine whether the particular Item will be found, or some other Item, or nothing at all will be found.

In the one of the exemplary embodiment of the described above propagations a car and car's part are used. The car is composed of the following parts: doors, bumpers, trunk, bonnet, fenders, etc. Each of them is an instance of the Class named Car's part and they are Items. An Item's property is a Color. Say the Color is propagated through car's parts. The Car 1 Item is the instance of the Car Class. The Red color can be used as an Item search condition, i.e. a user wants to find the Red Car. In this case, the colored parts of the car can determine the overall car color, i.e. if the one of the car's part has a colored red part the car's color is red.

In another example of the invention, a color can be propagated through at least one predicate, for example, a door predicate (a left_front_door predicate, a right_rear_door predicate), a bumper predicate, a trunk predicate, a bonnet predicate, a fender predicate, etc. For example, the bumper is 5 percent of the entire car, so the weight of this predicate is equal to 0.05. The weight of a door predicate is equal to 0.1, the weight of a trunk—0.2, a body—0.5, etc. Suppose the DB contains the following data for a Car 1: front and rear bumpers have a Green color, a body is Green, a trunk is Red and a door is Black.

So the Car 1 has a 60 percent of Green colored parts and 20 percent of Red colored parts and 10 percent of Black colored parts (a front left door has been replaced and is was not painted yet). Another Item, Car 2, can comprise 40 percent of Green colored parts (a Green colored trunk and two front Green colored doors), also it can comprise 50 percent of Red colored parts (in this case the car body has Red color) and 10 percent of the car are Black colored bumpers.

When the user initiates the Item search process by the Color (for example, Green color is used here), the DB can store (in form of ontologies and/or rules) the fact the car is Green if Green colored Car's parts are more than 0.5 percent (i.e., total weight of autotag predicates more than 0.5), and the car is Red if total weight of autotag predicates comes to more than 0.4 percent, and the car is Black and Red colored car, if the predicates weigh more than 0.5 for Red color and 9 percent for Black color.

In this case, if the Item Search process is initiated by the Color (1) Green color, (2) Red color or (3) Red and Black color, the search engine during the search process will combine autotag predicates of car parts, so the Car 1 is found as a Green colored car, but the Car 2 is found as Red and Red and Black Car. Note that the weight of the autotag predicate is a part of the total value (in this case 0.1 is 10% of the car color, 0.5 is 50%, etc.). The weights introduction and operations with them can vary, since the weight may represent the importance of a particular predicate, high priority, etc. So the propagation is an implicit/indirect relationship between Items.

Figure 7:
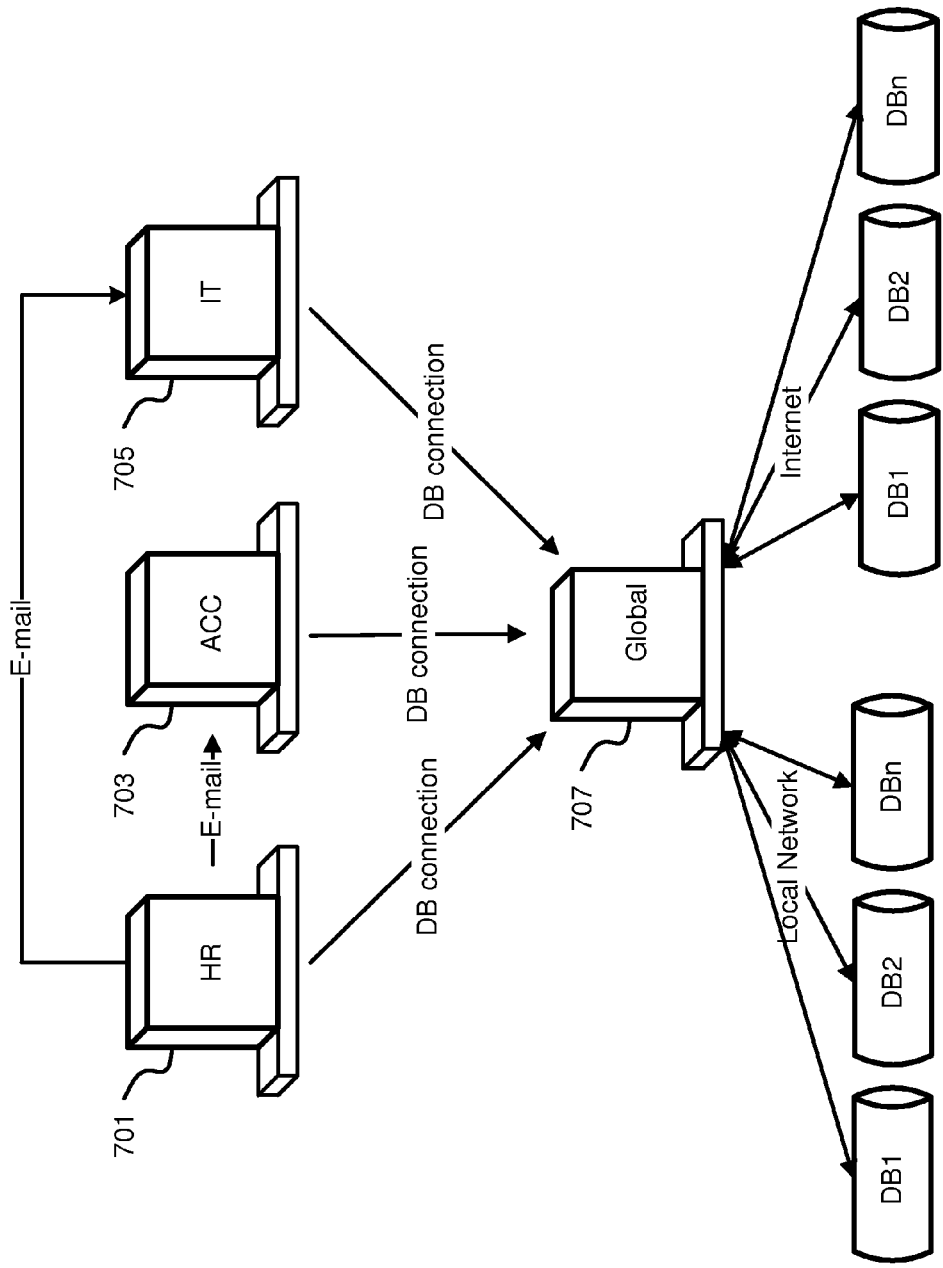
FIG. 7 illustrates an example of different business applications used in different departments of a company and data processing within them, in the exemplary case.

FIG. 7 illustrates an example of different business applications used in different departments of a company and data processing flow within them. Data from a database can be separated into the user data as axioms, facts, rules and the ontologies (presented as axioms as well, but which can be distinguished by N3 syntax). In other words, the ontologies contain information about what data and how data should be presented for the particular user in a particular business application. The facts and the ontologies are processed by the Core and the result of processing is data in a particular context according to the ontologies.

Thanks to the use of the RDF (Resource Definition Framework), it is possible to work with different data sources (e.g., databases, data storages local, located on a corporate network, or located on the Internet). It is possible to utilize a common dictionary URI, thereby permitting to integrate data from different servers. It is also possible, based on the data and the rules, to provide on-the-fly representation of data (rather than static slices (for example, snapshots), as is done with OLAP cubes).

The pool of information (for example, data from the all departments: IT (705), Development (not shown), HR (701), Management (not shown), Sales (not shown), Accounting (703) can be stored in different databases or other storages. Element 707 permits presenting contextualized business information for a particular application. "Global" is an entity for a representation of data in a particular context of a business application.

Context can be thought of as an environment surrounding a particular event, an object or an individual that defines the interpretation of data and actions/operations on data in a particular situation. Optionally, the context defines a method of processing data in a particular situation. For example, someone's email address can be treated as login information in one context and as contact information in user's profile in another context. It can be used as a requester in a support ticket a third context—all depending on interpretation of data.

Exchange of information between the servers is done automatically, since all the servers use a common dictionary. For example:
    http://<company_name>.com/tracker/ontology/global/hr, or
    http://<company_name>.com/tracker/ontology/global/it or
    http://<company_name>.com/tracker/ontology/global/ acc, all are conjoined into http://<company_name>.com/tracker/ontology/global Even in case where the accounting department, when creating an employee record manually, uses its own dictionary, it is possible to write a rule {?x a ACC:person}=>{?x a Global:employee}, thereby providing a translation mechanism between the accounting department's dictionary and the global dictionary.

From this example, it is clear that the proposed architecture permits each individual group or department within a business to work with its own database/storage and its own server system, while the global server with engine can present a combined view of all the data from all the departments. This is done on-the-fly and without duplicating the data, which is particularly important from the perspective of information security, as well as from a point of view of maintaining up-to-date information (in this case, when the data on one storage changes, there is no need to change the data on other storages).

The on-the-fly results of search representation based on the calculated autotags can be illustrated with the following example. Consider the ontology data (i.e., the data that describes the entities that are being manipulated) in the context of business applications, for example, project management, issue tracking, bug tracking, CRM, etc. Each one is stored in its own database (or, alternatively, in a common database), and are combined at a higher level. With the aid of a logical core it is possible to combine the various available data into different combinations and sets of ontologies, for example using specific ontologies. A developer can see the context of the representation of the bug submitted by QA as a task, assigned to him. In other words, it is possible to track to which task each particular bug relates to.

It is also worth discussing the difference between on-the-fly representations available with the approach described herein and static representations as provided by searching the data using the OLAP cubes (online analytical processing in real time). OLAP is a conventional technique for generating reports and different statistical documents. The OLAP cubes are frequently used by analysts to quickly process complex database queries, and they are particularly commonly found in marketing reports, sales reports, data mining, and so on, see U.S. Pat. No. 8,478,766, incorporated herein by reference, together with the invention as described herein, which is different from commonly used models, such as OLAP.

The reason that OLAP cubes are so widespread is the speed with which the processing can be performed. Relational databases store the information about the various entities in separate tables, which are usually well normalized. This structure is convenient for most operational database systems, however, complex multi-table queries are usually difficult to perform rapidly. A good model for such queries (rather than for changes) is a table constructed using facts from the OLAP cube.

The difficulty in using OLAP as a methodology is in generating the queries, selection of the basic data and generation of the appropriate schema, which is a reason why most modern OLAP products are typically supplied together with a lot of predefined queries.

Another problem is in the basic data of the OLAP cube, which needs to be complete and non-contradictory. Thus, the main problem with OLAP cubes is that the analysis process typically requires recreation of the cube itself or frequent regeneration of slices. Unlike OLAP cubes, the proposed approach, advantageously, permits on-the-fly regeneration of data (search results) representation, without the complexities of predefined and pre-generated queries. In brief, the process of the approach discussed herein can be described as follows:

the business layer requests data from the core;
the logical core collects the data from different sources;
the logical core recognizes the nature of the data and divides the data into axioms and rules. For example, for the bug tracker, an axiom could be "resolution:is "need more info"", and a rule could be {?o operation:hasRequiredData ?f. ?f bfield:empty True.}=>{?o operation:allow False};
the engine required for completing business layer request compiled rules is put together (for example, in C# code, although the invention is not limited to any particular programming language). The engine can have rules that have been collected and compiled previously, as well as new rules for the rules that have not been processed before. Therefore, the compilation needs to be performed for new rules only. Thus, the core does not need to constantly work with the data, but only addresses the data in response to requests from the business layer;
the engine processes the axioms, and the resulting new axioms are generated;
the core returns the requested data to the business layer.

An algorithm of processing data and Core (Engine) processing algorithm for working with axioms and rules is presented in U.S. Pat. No. 8,478,766.

Several types of rules can exist for data processing. The filter type rule is frequently used in the tracker cases, for example, receiving a list of support ticket/bugs/tasks from a particular user and a particular project with particular attributes. Therefore, from the overall pool of tasks/bugs/tickets, the information needs to be filtered for the particular user and project, and presented in a form of separate axioms.

Transformative rules relate to the same information that can be presented in a different manner. For example, the IT department views people as users of the IT system. On the other hand, a project manager can view the same people as resources working on particular tasks. As another example, transformative rules can include the following: at the input, data (axioms) is received that describes a particular ticket (i.e., requests from a particular end user) and its data representation. Therefore, the engine will receive, at the output, axioms in the form of a specific user interface, filled in with data.

Another example of a type of rule is a generating rule. For example, in a particular project that has more than 50% critical bugs and more than 50% critical tasks, the system automatically generates the fact about project status (e.g., the status of the project is listed as "Critical").

An example of the application of rules is as follows. The information is transformed from the bug tracker and from the project management task into the data for the ABC project. Then, only the bugs that have the status "critical" are filtered to remain and the engine counts total quantity of bugs, and then, if the quantity of "critical" bugs is more than a half of the total bugs, critical state of project bugs is generated:

{?bug cmw:is bug:Bug. ?bug prj:included prj:Project_ABC. {?bug prj:Status prjStatus:Critical} assert:count ?numCriticalBugs. {?bug prj:Status ?any} assert:count ?TotalBugs. (?TotalBugs 2) math:divide ?halfTotalBugs. ?numCriticalBugs math:greater ?halfTotalBugs.}=>{prj:Project_ABC prj:BugsCritical true}.

The same operations are performed under data (tasks) from project management systems:

{?task:is task:Task. ?task prj:included prj:Project_ABC. {?task prj:Status prjStatus:Critical} assert:count ?numCriticalTasks. {?task prj:Status ?any} assert:count ?TotalTasks. (?TotalTasks 2) math:divide ?halfTotalTasks. ?numCriticalTasks math:greater ?halfTotalTasks.}=>{prj:Project_ABC prj:TasksCritical true}.

Next, the automatic generation of the "Critical" project status is performed, if the project has tasks and bugs in "Critical" states:

{prj:Project_ABC prj:BugsCritical true. prj:Project_ABC prj:TasksCritical true}.=>{prj:Project_ABC prj:Status "Critical"}.

The same happens with project status, but with another condition: automatic generation "Critical" status for project when "critical" bugs or tasks come to more than a half.

{?x cmw:is task:Task}=>{?x cmw:is prj:TaskOrBug}.
{?x cmw:is bug:Bug}=>{?x cmw:is prj:TaskOrBug}.
{?x cmw:is prj:TaskOrBug. ?x prj:included prj:Project_ABC. {?x prj:Status prjStatus:Critical} assert:count ?numCritical. {?x prj:Status ?any} assert:count ?Total. (?Total 2) math:divide ?halfTotal. ?numCritical math:greater ?halfTotal.}=>{prj:Project_ABC prj:Status "Critical"}.

As will be appreciated by those skilled in the art, the real-life examples are typically more complex than the ones described above, and there can be many more types of rules in most of the real-life cases, however, the principle is the same.

The axiom conjunction example is frequently the most easily understood one. For example, when combining information regarding the requirements of the project (axiom "requirements"—requirements, defined by analysts) and the bugs from the bug tracker (axiom "bugs"—bugs, identified by the testers, who are typically quality control engineers, and filled out bug tracking forms based on certain requirements), "result axiom" results, which, in essence, is a combination of how many bugs are associated with a single functional requirement.

Figure 8:
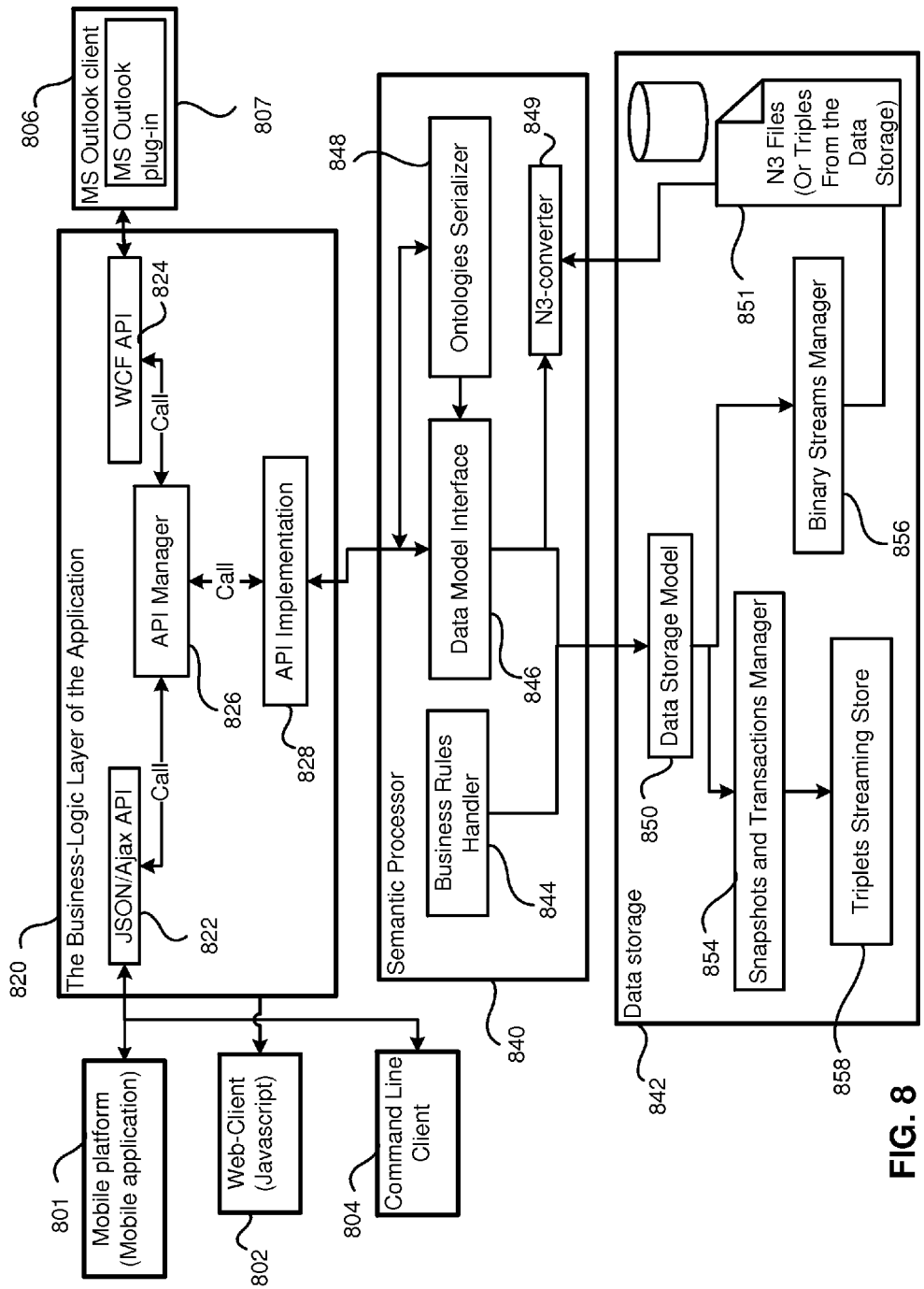
FIG. 8 illustrates the system in accordance with the exemplary embodiment.

FIG. 8 illustrates the system in one embodiment of the invention. JSON/Ajax API 822 is a module for realization of the protocol of the API methods calls using a JSON reporting format and with a data transmission over the HTTP using Ajax requests. WCF API 824 is a module that implements the protocol of the API methods call using the XML/SOAP representation format and a data transmission over HTTP.

The API manager module 826:
searches for the required API method,
implements the arguments' serialization to the data structures used in the business logic ontologies,
implements API method calls,
de-serializes the results returned by the method.

API manager module 826 uses N3-files 830 (which contains triples in the N3 format) for searching the method implementation 828, wherein "api:Method" ontology (for example) lists all methods, arguments types and return values. Implementation of the method is a program code. For example, it can save the data to a database, or it can close or open the task and other operations.

For example, a "CreateTask" API method is used for the task creation. The method accepts tasks data as an argument and returns the identifier for the created task. The JSON-handler gets the method name and arguments (a task data) in the JSON-format when the method is invoked via JSON-protocol. Then, arguments are converted to an internal representation of data in the memory and transmitted to the API manager. The API manager (which has a list of methods) can find the required "CreateTask" method by name. Then, the API manager validates arguments (the munber and type of) and implements a method "CreateTask." After the task was created by the "CreateTask" method, the API manager transfers back the result to the JSON-handler. The JSON-handler converts the result to the JSON format and sends it back to the client (for example, to the MS Outlook client or to a mobile device application).

API Manager loads the API specification and extension modules from the Database during the application start (MS Outlook plug-in 807). This specification can be requested by the Outlook plug-in 807 of MS Outlook client 806 or through a special Ajax-request or as a scheme in the WSDL-format with using a SOAP-protocol.

A Web Client 802 (for example, based on JavaScript, or on HTML5) or the Command Line Client 804 can be used instead of MS Outlook. Console client is the client application, which can call API methods using command line. Also, a mobile application on a mobile device 802 can be used.

JavaScript client is a client application, which is executed in the user web-browser and which can call API methods using JavaScript language.

Outlook Add-in (Outlook client) is the client application, which is executed in the MS-Outlook application which can call API methods with using WCF-protocol.

The Web Services Description Language (WSDL) is an XML-based interface description language that is used for describing the functionality offered by a web service. A WSDL description of a web service (also referred to as a WSDL file) provides a machine-readable description of how the service can be called, what parameters it expects, and what data structures it returns. Thus, it serves a purpose that corresponds roughly to that of a method signature in a programming language.

Next, the client applications (802, 804, 806) can make calls using Ajax-query reporting format JSON, or SOAP protocol.

The main stages of processing the request are:

1. Incoming request is processed by the HTTP-server (or by the External server or MS Exchange Server). JSON serialization or SOAP converting to internal formal occurs.

2. API manager 826 receives the input data and validates the input arguments to match the method description.

3. API Manager 826 loads and prepares required data model and creates the snapshot of the model for isolation from the other requests and operations. The write transaction is opened if the operation changes the model data.

4. Call the programming code (or rules with ontologies and Comindware® language) which executes the method.

5. The transaction is closed if the operation is a modifying operation, and checks for changes to security, the conflict detection, the update transaction history are performed.

6. The result is serialized in the format required by a customer and given to HTTP-response.

The business logic of the application 820 implements an object layer over the facts storage. Access to data is provided through the client API, which contains methods for objects reading/writing (e.g., object templates, business rules, etc.) Calls of the API methods by clients are implemented through the sessions that are created after the client authorization. This layer contains a number of system ontologies, such as, for example, "the template of the user object" or "business-rule." Ontologies are used in API for data serialization and validation.

The data storage 842 provides a physical storage for the model data on the hard disk drive. The data is sent to the data storage 842 and back out in the form of the facts (triples). A fact is a triple, which is stored in the model. Also, the fact can be obtained by applying the rules or requests. A data storage consists of:

triples streaming store 858 allows to record and query triples of special file format. Streaming store triples supports multiple types of queries on various components;

The transaction and snapshots manager 854 allows to create:

a. transactions. Transactions are the objects with the interface for atomic modification of the storage triples. Model changing is possible only within the framework of such a transaction while guaranteeing atomicity modification store triples (commit all changes made within a transaction, or none of them);

b. snapshots. Snapshots are objects with an interface for consistent read from the triple storage. It is guaranteed that none of the transactions (which were committed during the existence of the snapshot) affect its contents.

Triplets stored in the repository are simple, small objects (numbers, strings, names). The binary stream manager 856 is used to save large values (files, data streams) onto the storage. The stream is stored in a separate file, and a link to the stream is stored to this file;

The data storage model 850 represents a set of interfaces for managing data storage 851. Such interfaces can include transactions, snapshots, the interface for requesting the facts (triples) from the snapshot and interface for writing the facts to the transaction.

The semantic processor 840 contains a description of interfaces, such as name, facts (triples) and model rule.

The N3-converter 849 allows for generation of a data model based on the content of N3-file 830. (Note that the triples can be stored in a database in any format discussed above). A connection to the data store is another method of forming a pattern. Furthermore, the combined models can be formed, so multiple models are combined into one. Requests for such models lead to a request to the facts of each connected model. Record data while still working with only to one of the models.

A business rules handler 844 is an optional add-on over the data model. After handler 844 is connected with the model, it allows for computing derivatives based on existing facts and rules there.

The Data Model Interface 846 is a set of interfaces for requesting facts from the model, for writing to the model, transactions and model snapshots creating. The Ontologies Serializer 848 creates the queries to retrieve objects from the entire model based on the ontologies (description of the structure of objects stored in the model).

Transactions and queries are isolated using transactions. After a transaction is opened for write or read, the transaction is completely isolated from other transactions. Any changes in the data model made by other transactions are not reflected. Conflicts detection and resolution of conflicts are performed when closing the transaction, which was opened for writing. The so-called model optimistic concurrency is used. Detection of conflict occurs at the level of individual semantic facts. A conflict occurs when the fact has been modified by two transactions since the snapshot model was created and until the closing of the transaction. An exception will be generated during the conflict determination. In this case, the user can try updating the saved changes and try again to commit changes.

Optimistic concurrency control (OCC) is a concurrency control method for relational database management systems that assumes that multiple transactions can be completed without affecting each other and that therefore, transactions can proceed without locking the data resources that they affect. Before committing, each transaction verifies that no other transaction has modified its data. If the check reveals conflicting modifications, the committing transaction rolls back.

OCC is generally used in environments with a low data contention. When conflicts are rare, transactions can be completed without the expense of managing locks and without having transactions wait for other transactions' locks to clear, leading to higher throughput than other concurrency control methods. However, if conflicts happen often, the cost of repeatedly restarting transactions hurts performance significantly and other concurrency control methods have better performance under these conditions.

More specifically, OCC transactions involve these phases:

Begin: Record a timestamp marking the transaction's beginning.

Modify: Read database values, and tentatively write changes.

Validate: Check whether other transactions have modified data that this transaction has used (read or written). This includes transactions that had been completed after this transaction's start time, and optionally, transactions that are still active at validation time.

Commit/Rollback: If there is no conflict, make all changes take effect. If there is a conflict, resolve it, typically by aborting the transaction, although other resolution schemes are possible. Care must be taken to avoid a TOCT-TOU (Time-Of-Check-To-Time-Of-Use) bug, particularly if this phase and the previous one are not performed as a single atomic operation (see also discussion of the conflict resolving mechanisms between transactions, i.e., transactions not affecting each other, discussed above.)

Figure 9:
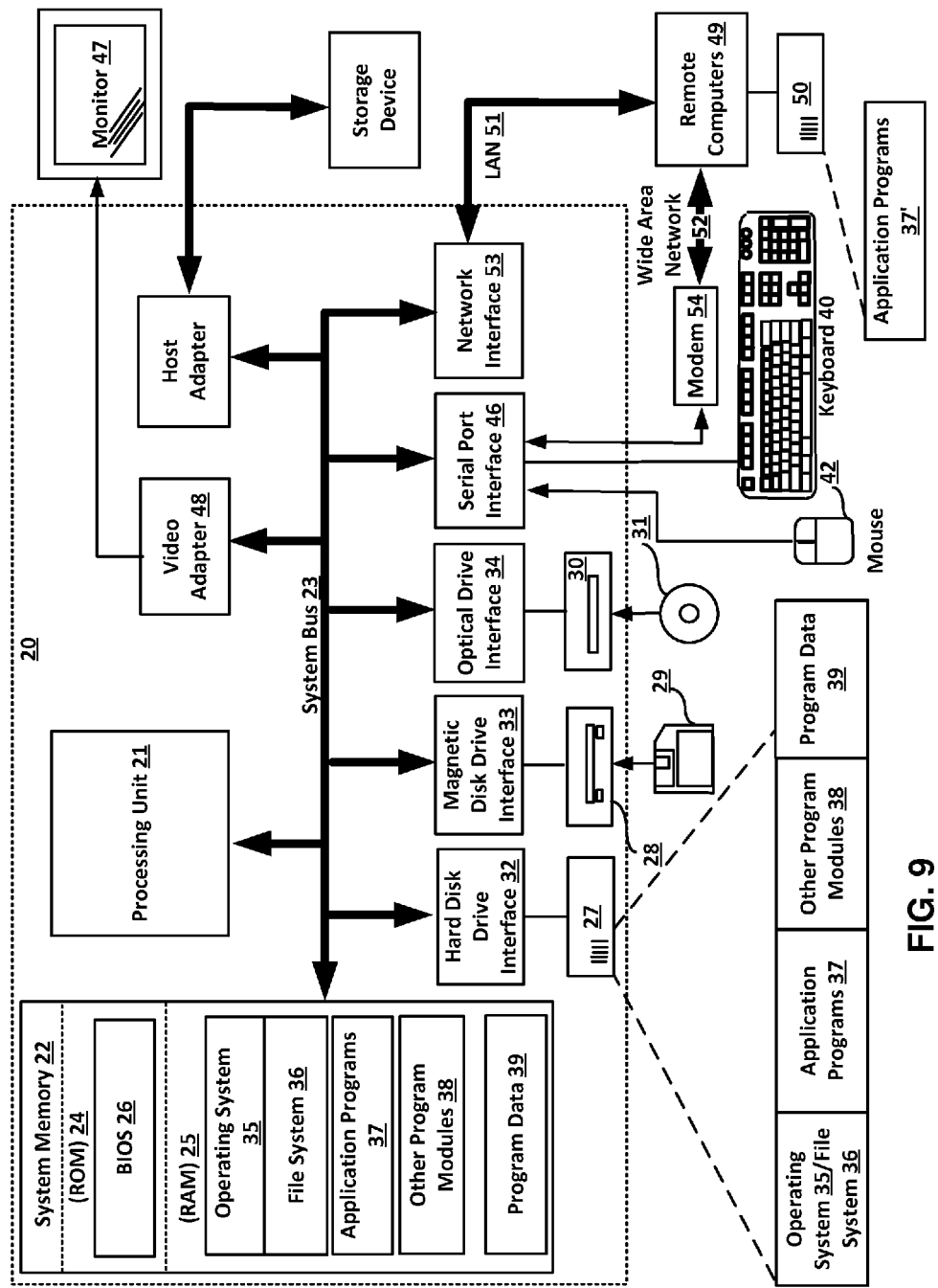
FIG. 9 illustrates a computer or server which can be used in the exemplary embodiment.

With reference to FIG. 9, an exemplary system for implementing the invention includes a general purpose computing device in the form of a computer 20 or a server, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, 37', other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A computer-implemented method for automated tagging of objects for search and retrieval from a graph-based database, the method comprising:
storing input data including axioms representing facts into data objects;
retrieving the data objects and converting the data objects into n-tuple format based on a context;
processing the axioms in order to determine a subject, a predicate and an object of the n-tuple;
defining attributes of the data objects at runtime;
analyzing the data objects and determining indirect relationships between the data objects based on the attributes, wherein the indirect relationships involve a link from one data object to another data object, which in turn links to a third data object, so as to link the first data object to the third data object;
automatically tagging the data objects with the auto-tags based on the indirect relationships between the data objects;
automatically tagging the data objects by auto-tags based on the attributes of the data objects;
ranking the data objects according to the auto-tags;
identifying a search area based on the data objects, wherein the search area is represented by a n-tuple predicates associated with the data objects;
representing search areas variants for specified search areas;
receiving a request for search of a data object in the search area; and
searching for auto-tagged data objects.

2. The method of claim 1, further comprising auto-marking the data objects based on the context.

3. The method of claim 2, wherein the context is defined by a corresponding ontology and represents an environment surrounding the data object.

4. The method of claim 3, wherein multiple ontologies are used for one data object.

5. The method of claim 2, wherein the context includes a method for processing the axioms based on a nature of the data object.

6. The method of claim 1, further comprising calculating the auto-tags on-demand.

7. The method of claim 1, wherein the data objects are represented by class instances.

8. The method of claim 1, further comprising a propagation of the auto-tags to specify at least one additional n-tuple predicate, which also is involved in searching for Items.

9. The method of claim 8, wherein a weight is assigned to the auto-tag predicate and used to Item search beyond any found auto-tag predicates.

10. The method of claim 8, wherein a weight describes a distance to a tree into which the Items are organized.

11. A system for automated tagging of data objects for search and retrieval from a graph-based database, the system comprising:
a processor;
a data source configured to provide data for processing by the processor of the system;
a data processing module configured to intercept and convert the data from the data source into n-tuple format; and
an auto-tag processing module coupled to the data processing module and configured to receive a request for processing the data from the data processing module and to
(a) define attributes of the data objects at runtime;
(b) add auto-tags to the data objects based on the attributes and based on a link from one data object to another data object, which in turn links to a third data object, so as to link the first data object to the third data object; and
(c) rank the data objects according the auto-tags; and
an item processing module coupled to the auto-tag processing module and configured to (i) create, delete and edit Items, (ii) to send at least one request to the auto-tag processing module for item search, and (iii) convert actions with the Items to n-tuples;
wherein the item processing module includes an event filter for intercepting the actions with the Items for auto-tag processing; and
wherein the data include axioms representing facts; and
wherein:
the data processing module searches for auto-tagged data objects; and
the data processing module searches the data objects based on the auto-tags using auto-tag predicates and values.

12. The system of claim 11, wherein the n-tuple is a triple of the Resource Description Framework (RDF).

13. The system of claim 12, wherein the triple comprises a subject, a predicate and an object.

14. The system of claim 11, wherein the data source is an RDF graph database.

15. The system of claim 11, wherein the auto-tag processing module searches for auto-tagged data objects using a taxonomy.

16. The system of claim 11, wherein the auto-tag processing module searches for auto-tagged data objects using a search request.

17. The system of claim 11, wherein the data objects are represented by a plurality of class instances.

18. The system of claim 11, wherein the auto-tags, auto-tag predicates and auto-tag values are stored in RAM.

19. The system of claim 12, wherein each data object is defined by a set of triples.

20. The system of claim 18, wherein a weight is assigned to each auto-tag predicate and used to Item search beyond any found auto-tag predicates.

21. The system of claim 11, wherein a weight describes a distance to a tree into which the Items are organized.

* * * * *